US012737670B2

(12) United States Patent

Hwang et al.

(10) Patent No.: US 12,737,670 B2

(45) Date of Patent: Sep. 15, 2026

(54) TRANSFORMATION OF DATA FROM LEGACY ARCHITECTURE TO UPDATED ARCHITECTURE

(71) Applicant: International Business Machines Corporation, Armonk, NY (US)

(72) Inventors: Jinho Hwang, Dobbs Ferry, NY (US); Larisa Shwartz, Greenwich, CT (US); Raghav Batta, San Jose, CA (US); Qing Wang, Chappaqua, NY (US); Pooja Aggarwal, Bengaluru (IN); Ajay Gupta, Bengaluru (IN); Harshit Kumar, Delhi (IN); Prateeti Mohapatra, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 736 days.

(21) Appl. No.: 17/491,749

(22) Filed: Oct. 1, 2021

(65) Prior Publication Data

US 2023/0121209 A1 Apr. 20, 2023

(51) Int. Cl.
*G06N 20/00* (2019.01)
*G06F 9/30* (2018.01)

(52) U.S. Cl.
CPC ......... *G06N 20/00* (2019.01); *G06F 9/30181* (2013.01)

(58) Field of Classification Search
CPC .... G06N 20/00; G06N 5/022; G06F 9/30181; G06F 18/23213; G06F 9/541
See application file for complete search history.

(56) References Cited

U.S. PATENT DOCUMENTS

| | | | |
|---|---|---|---|
| 6,826,627 | B2 | 11/2004 | Sjollema et al. |
| 7,143,099 | B2 | 11/2006 | Lecheler-Moore et al. |

(Continued)

FOREIGN PATENT DOCUMENTS

| | | | |
|---|---|---|---|
| CN | 110414771 | A | 11/2019 |
| CN | 112947955 | A | 6/2021 |

(Continued)

OTHER PUBLICATIONS

De Lauretis, Lorenzo. "From monolithic architecture to microservices architecture." 2019 IEEE International Symposium on Software Reliability Engineering Workshops (ISSREW). IEEE, 2019. (Year: 2019).*

(Continued)

*Primary Examiner* — Jennifer N Welch
*Assistant Examiner* — Megan Elizabeth Hwang
(74) *Attorney, Agent, or Firm* — Amin, Turocy & Watson, LLP

(57) ABSTRACT

One or more systems, computer-implemented methods and/or computer program products to facilitate a process to transform original operational data into updated operational data. A system can comprise a memory that stores computer executable components and a processor that executes the computer executable components stored in the memory. The computer executable components can comprise a transformation component that can transform original operational data of a first architecture into updated operational data employable at a second architectures, wherein the second architectures is an updated architectures relative to the first architecture. In one or more embodiments, the transformation component further can employ machine learning to match one or more data elements of the original operational data to one or more aspects of the second architecture.

14 Claims, 11 Drawing Sheets

(56) References Cited

U.S. PATENT DOCUMENTS

| | | | | |
|---|---|---|---|---|
| 7,548,898 | B1 * | 6/2009 | Tarenskeen | G06F 16/214 |
| 7,716,319 | B2 | 5/2010 | Kataoka et al. | |
| 8,131,686 | B2 | 3/2012 | Lakshmanachar et al. | |
| 9,021,484 | B2 | 4/2015 | Branch et al. | |
| 11,741,380 | B2 * | 8/2023 | Khawas | G06N 20/20 706/12 |
| 2004/0083199 | A1 | 4/2004 | Govindugari et al. | |
| 2006/0248107 | A1 * | 11/2006 | Coronado | G06F 8/60 707/999.102 |
| 2009/0144319 | A1 * | 6/2009 | Panwar | G06F 16/25 707/999.102 |
| 2018/0046779 | A1 * | 2/2018 | Millen | G06F 16/2379 |
| 2020/0081899 | A1 * | 3/2020 | Shapur | G06F 16/211 |
| 2020/0371705 | A1 | 11/2020 | Ramakrishnan et al. | |
| 2022/0374442 | A1 * | 11/2022 | Kaspa | G06N 5/04 |
| 2023/0259520 | A1 * | 8/2023 | Failer | G06F 16/254 707/602 |

FOREIGN PATENT DOCUMENTS

| | | | |
|---|---|---|---|
| CN | 112948405 | A | 6/2021 |
| CN | 113065801 | A | 7/2021 |
| WO | 201527954 | | 3/2015 |
| WO | 201897490 | | 5/2018 |
| WO | 202084641 | | 4/2020 |
| WO | 2020082984 | A1 | 4/2020 |
| WO | 2023/051527 | A1 | 4/2023 |

OTHER PUBLICATIONS

Rahm, Erhard, and Hong Hai Do. “Data cleaning: Problems and current approaches.” IEEE Data Eng. Bull. 23.4 (2000): 3-13. (Year: 2000).*

Kazanavičius, Justas, and Dalius Mažeika. “Migrating legacy software to microservices architecture.” 2019 Open Conference of Electrical, Electronic and Information Sciences (eStream). IEEE, 2019. (Year: 2019).*

Mell et al., “The NIST Definition of Cloud Computing,” Recommendations of the National Institute of Standards and Technology, NIST Special Publication 800-145, Sep. 2011, 7 pages.

International Search Report and Written Opinion for International Application No. PCT/CN2022/121739 dated Nov. 28, 2022.

* cited by examiner

TRANSFORMATION OF DATA FROM LEGACY ARCHITECTURE TO UPDATED ARCHITECTURE

BACKGROUND

One or more embodiments described herein relate to transforming data from a first architecture to a second architecture being different than the first architecture, and more specifically to transforming, such as modernizing, data from a legacy architecture for use at an updated or new architecture.

When transforming, such as modernizing, an architecture, such as an application, to an updated or new architecture and/or version, it is often the case that operational data associated with the architecture is not transformed together with the architecture. Indeed, it can be difficult to decompose operational data based only on a modernized architecture and/or decomposed modernized architecture, such as derived from an architecture modernization engine. Accordingly, operational data from the previous or legacy architecture can be unavailable and/or unattainable.

The operational data can include, but is not limited to, tickets, change management information, root cause analysis, operation logs, other data logs, metrics, alerts, topology, communication data and/or other data. Such operational data can be utilized by the architecture or by an entity, such as an administrating entity, relative to the architecture. For example, operational data can be employed and/or analyzed for issue spotting, issue solving, network capabilities, network concerns and storage/access issues, among others. That is, one or more of these issues and/or concerns relative to the legacy or previous architecture can be utilized for the same and/or similar issues and/or concerns relative to the updated or new architecture and/or version.

The unavailability and/or unattainability of operational data for an updated architecture can be a problem where an entity, such as reliability and/or administrating entity associated with the previous or legacy architecture is not familiar with the updated architecture. As used herein, the term "entity" can refer to a machine, device, smart device, component, hardware, software and/or human. Learning from past activities, such as via operational data could assist such entities to resolve issues and/or concerns relative to the new or updated architecture more easily, quickly and/or efficiently. Likewise, such problem of unavailable and/or unattainable operational data also can exist where an entity, such as reliability and/or administrating entity associated with the updated architecture lacks historical operational data for use in problem-solving and/or issue-spotting, for example. As such, learning from past activities, such as via operational data could assist such entities to resolve issues and/or concerns relative to the new or updated architecture more easily, quickly and/or efficiently.

Because the operational data from a previous architecture can be useful relative to the updated or new architecture and/or version, transformation of the operational data for use with and/or employment by the updated or new architecture and/or version can be desired.

SUMMARY

The following presents a summary to provide a basic understanding of one or more embodiments described herein. This summary is not intended to identify key or critical elements, or to delineate any scope of the particular embodiments and/or any scope of the claims. The sole purpose of the summary is to present concepts in a simplified form as a prelude to the more detailed description that is presented later. In one or more embodiments described herein, devices, systems, computer-implemented methods, apparatuses and/or computer program products are described that can facilitate a process to transform operational data from a legacy architecture to a new or updated architecture and/or version thereof, which can include transforming original operational data into updated operational data.

1 According to an embodiment, a system can comprise a processor that executes computer executable components stored in memory, where the computer executable components comprise a transformation component that transforms original operational data of a first architecture into updated operational data employable at a second architectures, wherein the second architectures is an updated architectures relative to the first architecture.

According to another embodiment, a computer-implemented method can comprise transforming, by a system operatively coupled to a processor, original operational data of a first architecture into updated operational data employable at a second architectures, wherein the second architectures is an updated architectures relative to the first architecture.

According to yet another embodiment, a computer program product can facilitate a process to transform original operational data into updated operational data, the computer program product comprising a computer readable storage medium having program instructions embodied therewith, the program instructions executable by a processor to cause the processor to, transform, by the processor, the original operational data of a first architecture into the updated operational data employable at a second architectures, wherein the second architectures is an updated architecture relative to the first architecture.

An advantage of such system, computer-implemented method and/or computer program product can be fast and efficient problem-solving and/or issue-spotting relative to an updated or new architecture based on employment of transformed historical data relative to a historical or legacy version of the updated or new architecture. Indeed, transformation of a legacy architecture to a new or updated (e.g., modernized) architecture often does not likewise provide for transformation of operational data associated with the legacy architecture. Absent such transformation of the operational data, an entity using or operating on the updated or new architecture can be at a loss for understanding of one or more problems and/or issues. That is, one or more problems associated with the legacy architecture can still be present in one or more forms at the updated architecture, and/or one or more new problems associated with the updated architecture can have a basis and/or relation to the respective previous legacy architecture. Furthermore, the operational data transformed from the previous architecture to the updated architecture can be employed to train one or more machine learning models and/or to guide one or more AI-based processes and/or operations relative to the updated architecture. Absent transformation of the legacy operational data, this training data can be unavailable or unattainable.

In one or more embodiments of the above system, computer program product and/or method, machine learning can be employed to match one or more data elements of the original operational data to one or more aspects of the second architecture. An advantage of such system, computer-implemented method and/or computer program product can be disentanglement of data, such as operational data, relative to the legacy architecture for use with the updated architecture. Indeed, an element of data relative to the legacy architecture can thus be transformed for one or more aspects of the updated architecture. Likewise, plural elements of data relative to the legacy architecture can be combined and/or summated for transformation for use with a single aspect of the updated architecture.

DETAILED DESCRIPTION

Figure 1:
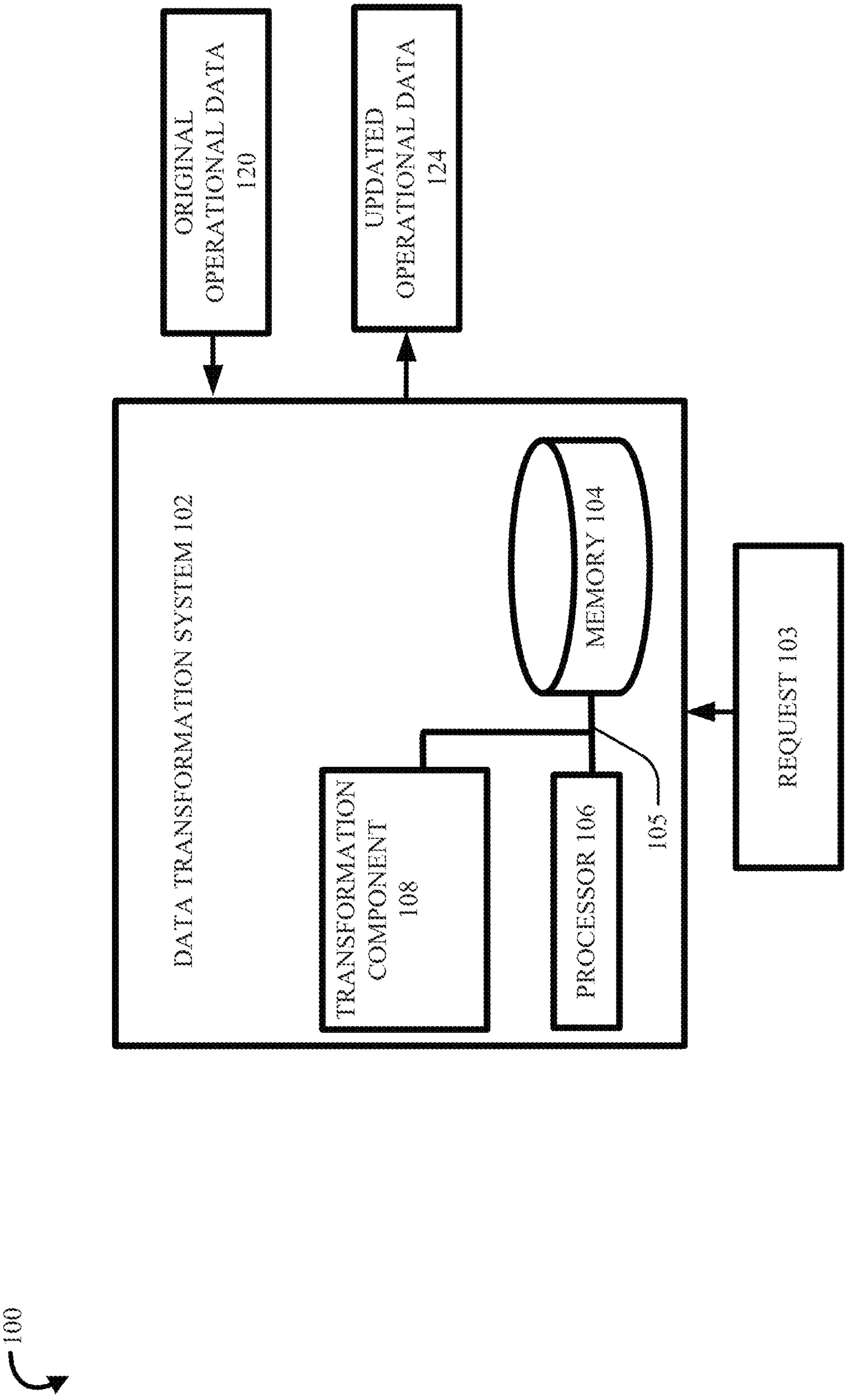
FIG. 1 illustrates a block diagram of an example, non-limiting system that can facilitate a process to transform original operational data into updated operational data t in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in this Detailed Description section.

Given lack of existing approaches to transform original data, such as operational data, from a primary architecture to an updated and secondary architecture, the one or more embodiments described herein can provide for such transformation to updated data, such as updated operational data. The transformation can include extraction, resolution, disentanglement, duplication, deletion, reformatting, modification and/or other operations performed on and/or relative to the original data. It will be appreciated that the one or more embodiments are described herein relative to operational data from and/or relating to an original architecture that is different from an updated architecture. However, the one or more embodiments described herein are also applicable to, and can provide for transformation of, other types of data relative to an original architecture, such as collateral to and/or not stored directly at and/or with the original architecture and/or not directly embedded in and/or with the original architecture.

With respect to architectures, an original and/or legacy architecture can be a monolithic architecture, such as a monolithic application. An updated architecture can be cloud-based, microservice-based, other SOA (service-oriented architecture)-based and/or otherwise provide a generally non-monolithic architecture. As such, data employed by and/or written relative to an original architecture cannot merely be utilized via simple plug-and-play techniques relative to an updated architecture.

With respect to operational data, such data can include, but is not limited to, tickets, change management information, root cause analysis, operation logs, other data logs, metrics, alerts, topology, communication data and/or other data. Such operational data can be utilized by the original architecture and/or by an entity, such as an administrating entity, relative to the original architecture. Likewise, once transformed, the updated operational data can be utilized by the updated architecture and/or by an entity, such as an administrating entity, relative to the updated architecture. For example, operational data can be employed and/or analyzed for issue spotting, issue solving, network capabilities, network concerns and/or storage/access issues, among others. That is, one or more of these issues and/or concerns relative to the legacy or previous architecture can be utilized for the same and/or similar issues and/or concerns relative to the updated or new architecture and/or version.

Indeed, relative to one or more updated architectures, one or more cloud-based systems and/or approaches can be employed in such non-monolithic architectures. Artificial intelligence and/or machine learning algorithms and/or techniques can be applied, which can reply rely upon large amounts of data to perform well, such as with speed and/or efficiency. Such data in existing systems can be undesirably created, prepared and/or otherwise obtained from the ground up, due to the existing unavailability and/or unattainability of operational data, e.g., as historical data, from legacy architectures related to the one or more updated architectures.

For example, relative to a microservice-based architecture, analysis of data relative to various microservices can employ data segregation including special understanding and/or treatment, such as to avoid mixing of data information and/or to achieve aligned/global time of the data information across two or more microservices. Adding to this complexity, one or more entities operating on the one or more updated architectures, such as site reliability engineers or subject matter experts, can be unfamiliar with cloud native management, for example, and yet unable to learn from past activities and/or historical data.

To account for one or more of these deficiencies, a non-limiting system, as described herein, can employ machine learning (ML) techniques to learn one or more characteristics relative to one or more elements of operational data for an original architecture. An ML model can be employed to extract data elements, resolve data elements and/or to build one or more clusters to aid in decomposing the original data derived from and/or related to the original monolithic architecture. Feedback can be collected to continuously improve upon the accuracy, speed and/or efficiency of the ML model. Feedback can be provided by one or more administering entities, to correct, clarify and/or better transform the original operational data. Over successive iterations of employing the non-limiting system, such as relative to various different original architectures, it will be appreciated that the entity-based feedback can become less used to achieve a successful transformation outcome. As will be appreciated, success can be measured by accurate transformation of data for one aspect of an updated architecture relative to transformation of data for other aspects of an updated architecture. In this way, the transformed updated operation data can ideally correspond to the various aspects of a non-monolithic updated architecture.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Further, it will be appreciated that the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems 100 and/or 200 as illustrated at FIGS. 1 and/or 2, and/or systems thereof, can further comprise one or more computer and/or computing-based elements described herein with reference to an operating environment, such as the operating environment 900 illustrated at FIG. 9. In one or more described embodiments, computer and/or computing-based elements can be used in connection with implementing one or more of the systems, devices, components and/or computer-implemented operations shown and/or described in connection with FIGS. 1 and/or 2 and/or with other figures described herein.

Turning first generally to FIG. 1, illustrated is a block diagram of an example, non-limiting system 100 that can facilitate a process to transform original operational data into updated operational data, in accordance with one or more embodiments described herein. The non-limiting system 100 can be employed for transforming the original data from a form relative to an original architecture to a form relative to a second architecture, such as an updated architecture, that is different from the original architecture. While referring here to one or more processes, facilitations and/or uses of the non-limiting system 100, it will be appreciated that description provided herein, both above and below, also can be relevant to one or more other non-limiting systems described herein, such as the non-limiting system 200, to be described below in detail.

As illustrated at FIG. 1, the non-limiting system 100 can comprise a data transformation system 102. Data transformation system 102 can comprise one or more components, such as a memory 104, processor 106, bus 105 and/or transformation component 108. Generally, data transformation system 102 can facilitate transformation of original data having a first format to updated data having a second format, where the second format is different from the first format. The first format can be employed relative to an original architecture, while the second and different format can be employed relative to an updated architecture, where the updated architecture is different from the original architecture. For example, the first format can be constructed relative to a monolithic application, while the second format can be constructed relative to a non-monolithic architecture having plural aspects that can function alongside one another and/or can cooperate with one another to achieve one or more results. Data from one or more such aspects can be employed by another one or more such aspects.

One or more aspects of a component can be employed separately and/or in combination, such as employing one or more of a memory or a processor of a system that includes the component to thereby facilitate transformation of one or more elements of original operational data 120. The transformation component 108 can employ the processor 106 and/or the memory 104. Additionally, and/or alternatively, the processor 106 can execute one or more program instructions to cause the processor to perform one or more operations by the transformation component 108.

Turning now to one or more operations of the data transformation system 102, the transformation component 108 can receive a request 103 to provide data for use by an updated architecture. The request 103 can be received and/or retrieved by any suitable means. The request 103 can comprise a specified type of original operational data to transform and/or provide one or more aspects of the updated architecture that will employ the transformed data. The request 103 can be provided in any suitable format, such as a text format, binary format and/or another suitable format. In one or more embodiments, the request 103 can be received by the data transformation system 102, such as by a component and/or aspect of the data transformation system 102 other than the transformation component 108, such as the memory 104, a mail component and/or a download component.

Employing the information comprised by the request 103, the transformation component 108 can extract one or more elements of the original operational data 120. The extraction can be from the original architecture itself, from one or more files and/or databases collateral to and/or coupled to the original architecture, and/or from one or more files and/or databases that are separate from the original architecture.

As will be appreciated and described in greater detail relative to one or more additional embodiments, the transformation component 108 can employ any of artificial intelligence, machine learning, model generation, data resolution processing, data clustering and/or entity feedback to transform the original operational data 120 to updated operational data 124. For example, a log (e.g., an element of data) of the original operational data 120, relative to a monolithic application, can be decomposed into two or more portions that can be rewritten, reformatted and/or merely disentangled from one another and transferred and/or copied for employment by plural different aspects of an updated non-monolithic architecture. It will be understood that access to, analysis of, and/or comparison relative to the updated architecture is not employed by existing techniques.

Further, it also is to be appreciated that one or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively transform one or more elements of operational data in the time that one or more embodiments described herein can facilitate this process. And, neither can the human mind nor a human with pen and paper electronically transform one or more elements of operational data as conducted by one or more embodiments described herein.

In view of the operations performed by the transformation component 108, fast and efficient problem-solving and/or issue-spotting relative to an updated or new architecture and based on employment of transformed historical data relative to a historical or legacy version of the updated or new architecture, can be performed. One or more problems associated with the updated architecture, which can have a basis and/or relation to the respective previous legacy architecture, can be addressed, solved and/or analyzed employing the updated operational data 124 output by the data transformation system 102.

Figure 2:
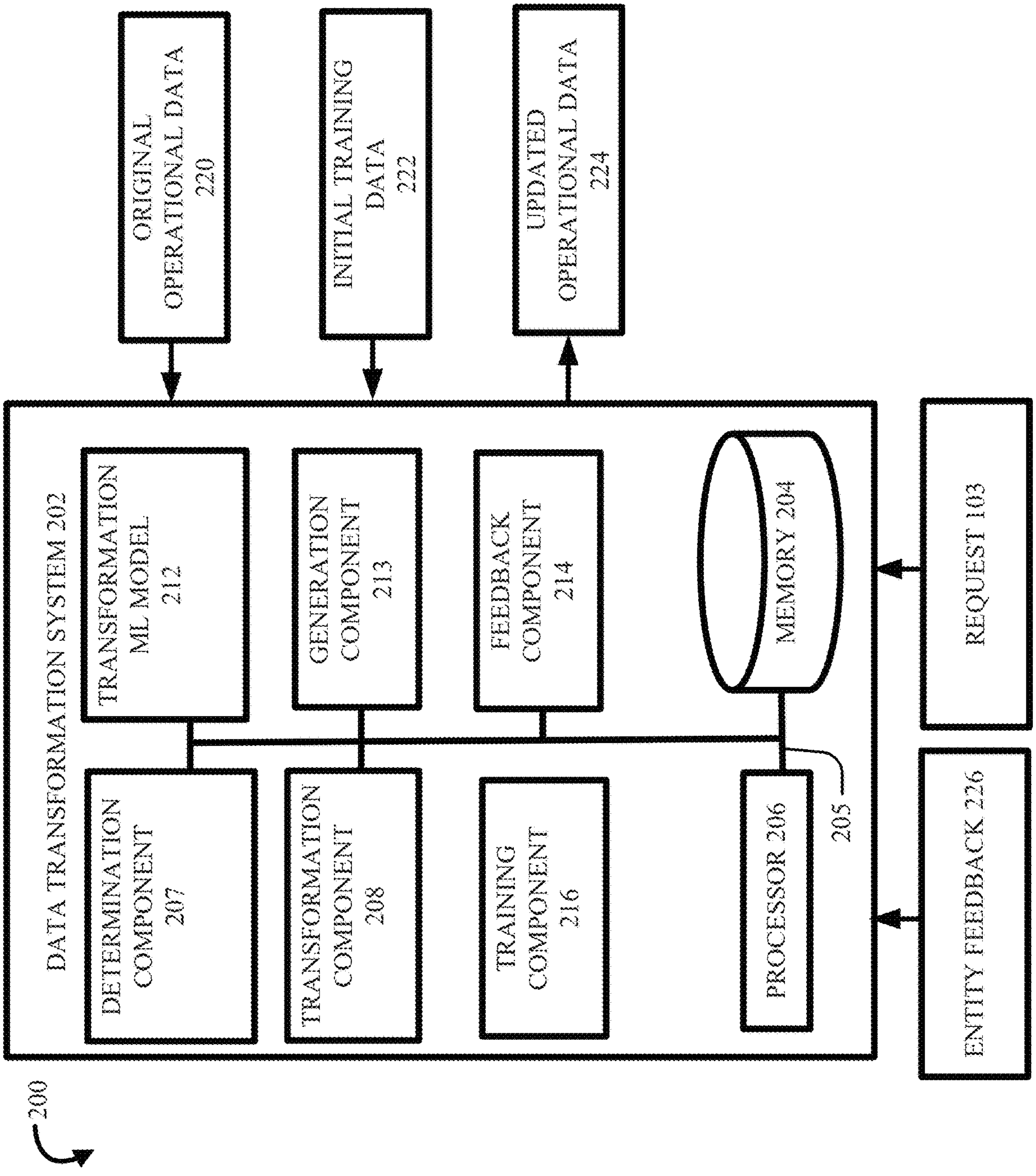
FIG. 2 illustrates another block diagram of an example, non-limiting system that can facilitate a process to transform original operational data into updated operational data, in accordance with one or more embodiments described herein.

Turning next to FIG. 2, the figure illustrates a diagram of an example, non-limiting system 200 that can facilitate a process to transform original operational data into updated operational data. Repetitive description of like elements and/or processes employed in respective embodiments is omitted for sake of brevity. As indicated previously, description relative to an embodiment of FIG. 1 can be applicable to an embodiment of FIG. 2. Likewise, description relative to an embodiment of FIG. 2 can be applicable to an embodiment of FIG. 1.

As illustrated at FIG. 2, the non-limiting system 200 can comprise a data transformation system 202. The data transformation system 202, as illustrated, can comprise any suitable type of component, machine, device, facility, apparatus and/or instrument that comprises a processor and/or can be capable of effective and/or operative communication with a wired and/or wireless network. All such embodiments are envisioned. For example, data transformation system 202 can comprise a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device. Likewise, the data transformation system 202 can be disposed and/or run at any suitable device, such as, but not limited to a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device.

The data transformation system 202 can be associated with, such as accessible via, a cloud computing environment. For example, the data transformation system 202 can be associated with a cloud computing environment 1050 described below with reference to FIG. 10 and/or with one or more functional abstraction layers described below with reference to FIG. 11 (e.g., hardware and software layer 1160, virtualization layer 1170, management layer 1180 and/or workloads layer 1190).

It will be appreciated that operation of the non-limiting system 200 and/or of the data transformation system 202 is not limited to transformation of a single element of original operational data and/or to transformation relative to a single original architecture at a time. Rather, operation of the non-limiting system 200 and/or of the data transformation system 202 can be scalable. For example, the non-limiting system 200 and/or the data transformation system 202 can facilitate transformation of plural elements of original operational data 220 and/or can facilitate such transformation relative to one or more original architectures and/or updated architectures in parallel with execution of one or more other data transformations. In one or more embodiments, one or more components of the non-limiting system 200 and/or of the data transformation system 202 can be employed to execute at the same time two or more data transformations.

The data transformation system 202 can comprise one or more components, such as a memory 204, processor 206, bus 205, transformation component 208, generation component 213, feedback component 214, training component 216 and/or transformation ML model 212. Generally, data transformation system 202 can facilitate transformation of original data, such as original operational data 220, having a first format to updated data, such as updated operational data 224, having a second format, where the second format is different from the first format. The first format can be employed relative to an original architecture, while the second and different format can be employed relative to an updated architecture, where the updated architecture is different from the original architecture. For example, the first format can be constructed relative to a monolithic application, while the second format can be constructed relative to a non-monolithic architecture having plural aspects that can function alongside one another and/or can cooperate with one another to achieve one or more results. Data from one or more such aspects can be employed by another one or more such aspects.

One or more of the aforementioned components can be employed to address a request 203 to provide data for use by an updated architecture. The request 203 can be received and/or retrieved by any suitable means, such as by the determination component 207. The determination component 207 can employ any one or more aspects of an operating environment, such as the operating environment 900 (FIG. 9), to receive and/or retrieve the request 203. By way of a non-limiting example, the request 203 can be uploaded from the HDD 914, received from the memory/storage 952 via the WAN 956 and/or downloaded via the WAN 956 from a node, such as a cloud computing node 1010 of a cloud computing environment 1050 (FIG. 10).

The request 203 can comprise a specified type of original operational data to transform and/or provide one or more aspects of the updated architecture that will employ the transformed data. The request 203 can be provided in any suitable format, such as a text format, binary format and/or another suitable format. In one or more embodiments, the request 203 can be received by a component other than the determination component 207, such as the memory 204, a mail component and/or a download component.

One or more communications between one or more components of the non-limiting system 200, and/or between an entity providing the request 203 and the non-limiting system 200, can be facilitated by wired and/or wireless means including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEER, RF4CE protocol, WirelessHART protocol, 6LoWPAN (Ipv6 over Low power Wireless Area Networks), Z-Wave, an ANT, an ultra-wideband (UWB) standard protocol and/or other proprietary and/or non-proprietary communication protocols.

Discussion now turns to the processor 206, memory 204 and bus 205 of the data transformation system 202.

For example, in one or more embodiments, data transformation system 202 can comprise a processor 206 (e.g., computer processing unit, microprocessor, classical processor, quantum processor and/or like processor). In one or more embodiments, a component associated with data transformation system 202, as described herein with or without reference to the one or more figures of the one or more embodiments, can comprise one or more computer and/or machine readable, writable and/or executable components and/or instructions that can be executed by processor 206 to facilitate performance of one or more processes defined by such component(s) and/or instruction(s). In one or more embodiments, the processor 206 can comprise the transformation component 208, training component 210, generation component 213, training component 216 and/or feedback component 214.

In one or more embodiments, the data transformation system 202 can comprise a computer-readable memory 204 that can be operably connected to the processor 206. The memory 204 can store computer-executable instructions that, upon execution by the processor 206, can cause the processor 206 and/or one or more other components of the data transformation system 202 (e.g., the transformation component 208, training component 210, generation component 213, training component 216 and/or feedback component 214) to perform one or more actions. In one or more embodiments, the memory 204 can store computer-executable components (e.g., the transformation component 208, training component 210, generation component 213, training component 216 and/or feedback component 214).

Data transformation system 202 and/or a component thereof as described herein, can be communicatively, electrically, operatively, optically and/or otherwise coupled to one another via a bus 205 to perform functions of non-limiting system 200, data transformation system 202 and/or one or more components thereof and/or coupled therewith. Bus 205 can comprise one or more of a memory bus, memory controller, peripheral bus, external bus, local bus, quantum bus and/or another type of bus that can employ one or more bus architectures. One or more of these examples of bus 205 can be employed to implement one or more embodiments described herein.

In one or more embodiments, data transformation system 202 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical and/or quantum computing devices, communication devices and/or like devices), such as via a network. In one or more embodiments, one or more of the components of the non-limiting system 200 can reside in the cloud, and/or can reside locally in a local computing environment (e.g., at a specified location(s)).

In addition to the processor 206 and/or memory 204 described above, data transformation system 202 can comprise one or more computer and/or machine readable, writable and/or executable components and/or instructions that, when executed by processor 206, can facilitate performance of one or more operations defined by such component(s) and/or instruction(s).

Turning now to one or more additional operations of the data transformation system 202, the transformation component 208 can perform one or more transformation processes including, but not limited to, extraction, resolution, disentanglement, duplication, deletion, reformatting, modification and/or other operations performed on and/or relative to the original data.

Employing the information comprised by the request 203, the transformation component 208 can extract one or more aspects of original operational data 220. The extraction can be from the original architecture itself, from one or more files and/or databases collateral to and/or coupled to the original architecture, and/or from one or more files and/or databases that are separate from the original architecture.

It will be appreciated that the operational data can be structured and/or unstructured. Relative to structured data, the transformation component 208 can locate a field of the original operational data 220. In one embodiment, where a field is in free form, the one or more respective data elements can be treated as unstructured data. Relative to unstructured data, one or more extraction techniques can be employed by the transformation component 208. Rule-based element extraction can be employed based upon one or more known rules, such as relative to one or more characteristics of the original operational data 220. These rules can be dictionary regular expression based. For example date-time regular expression can be defined to detect date or time aspects. Such characteristics can include data type, data format, key words, phrases and/or other suitable characteristics. Query-language-based element extraction can be employed. Indeed, based on historical data relative to one or more original architectures, a database can be generated, such as by the transformation component 208, such as a dictionary. The database can include one or more lookup tables. The database can be employed by the transformation component 208 relative to one or more original architectures to determine entity names and/or particular data characteristics. A query language can be defined to extract entities from dictionary or database. For example query language can be defined to extract <PersonaName> which can consist of <FirstName> and <LastName>. Additionally, and/or alternatively, language-model-based element extraction can be employed. Such model can be trained on labeled data using deep learning or Conditional Random Fields based methods. A trained language model can be employed.

The transformation component 208 can further conduct one or more resolutions of the extracted data. Element resolution can allow for labeling one or more elements of one or more datasets to correspond to one or more aspects of the updated architecture. This labeling can assist the transformation component 208 during disentanglement. For example, regarding element resolution, one or more names and/or phrases can be extracted from the elements themselves, whether being structured data or unstructured data, such as based on the one or more aforementioned extraction principles and/or techniques.

Figure 3:
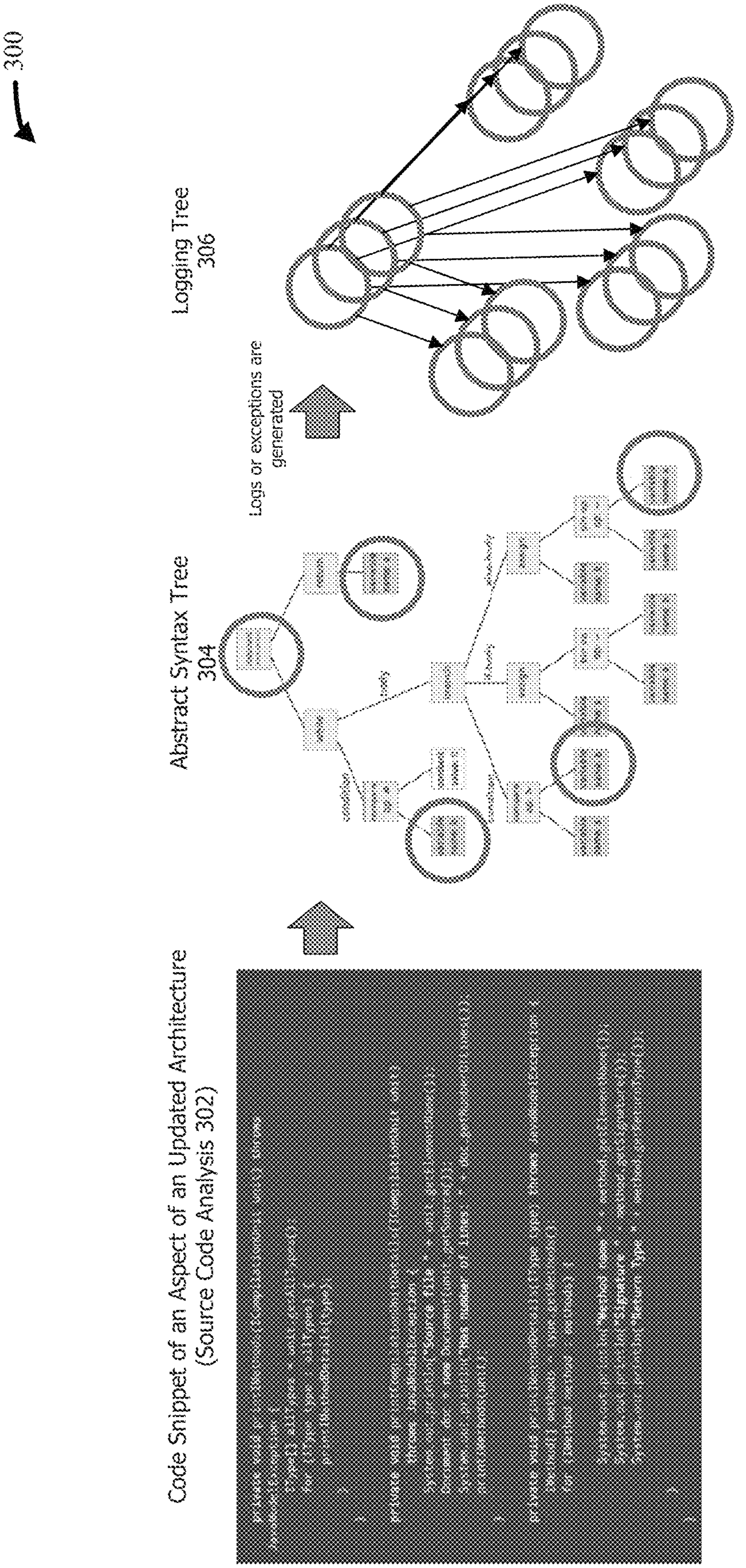
FIG. 3 illustrates a flow diagram of a resolution process facilitated by the non-limiting system of FIG. 2, in accordance with one or more embodiments described herein.

Turning briefly to FIG. 3, the transformation component 208 can generate and/or employ a generated logging tree 306, such as from a syntax tree 304. In one embodiment, a syntax tree 304 can be generated employing source code analysis 302 of the updated architecture, such as employing the source code of the updated architecture, and/or such as employing lexical analysis and/or syntactical analysis from respective parse trees. Relative to the particular example of FIG. 3, source code analysis 302 can be of an original microservice architecture. By generating logs and/or exceptions relative to the syntax tree 304, such as generated using original code from the original architecture, the logging tree 306 can be generated. The transformation 208 can search, such as traverse, the logging tree, identifying a last matched node (e.g., other than a leaf node) as a closest node for the one or more elements of the original operational data 220.

Indeed, relative to one or more updated architectures, plural aspects of an updated architecture can have correlation established with a same one or more elements of the original operational data 220. Likewise, one or more elements of the original operational data 220 can have correlation established to a same aspect of an updated architecture. Accordingly, an element of the original operational data 220 can be duplicated, copied and/or otherwise plurally transferred and/or identified relative to the updated architecture. In one or more other embodiments, different portions (e.g., sub-elements) of an element of the original operational data 220 can be correlated to different aspects of an updated architecture.

It will be appreciated that the data element resolution, establishing one or more correlations, can be omitted in one or more embodiments relative to one or more elements of the original operational data 220.

Turning again to FIG. 2, in one or more embodiments, the transformation component 208 can employ one or more processes to disentangle the extracted and/or resolved data. That is, relative to a monolithic architecture, elements of information having a same typing (e.g., logs, tickets, root cause analyses and/or other types) can be collected and/or stored at a same location or set of locations. For example, logs can be stored in a single log file, which log file can be spread across plural actual digital files. Accordingly, correspondence to updated architecture, such as a cloud native form, is not yet ascertained. Furthermore, relative to an updated architecture having and/or employing one or more microservices, the one or more microservices can be unable to use elements of operational data unless decomposed (e.g., as part of the respective transformation). In one or more embodiments, temporal and/or spatial separations and/or one or more language models can be employed to disentangle one or more elements of the original operational data 220 relative to one or more other elements of the original operational data 220.

Subsequent to, and/or at least partially in parallel with, the data extraction, resolution and/or disentanglement, the transformation component 208 can employ machine learning and/or artificial intelligence techniques and/or models to match one or more elements of the extracted original operational data 220 to one or more aspects of the updated architecture for which transformed data is being sought. This process can include clustering of the extracted, resolved and/or disentangled elements of the original operational data relative to one or more distinct aspects of the updated architecture. In this manner, elements, or even portions of elements, of the original operational data can be ultimately transformed to the updated operational data 224.

In one or more embodiments, a machine learning model can be employed to cluster one or more elements of the original operational data 220 having data characteristics, labels, language, data type and/or other representation correlating to one or more aspects of the updated architecture. The updated architecture aspects can be characterized such as employing language, data type and/or source code. In one example, clustering can be performed based on entities which can be defined based on microservices like database, payment, security etc. One can define set of keywords to define each entity and clustering can use these entities.

Clustering can be particularly employed where there is low and/or lack of correlation from resolution processes. This lack and/or low correlation can be an issue related to certain types of elements of operational data, such as tickets, such as due to a lack of correlation between source code and description on the tickets as originally written. Accordingly, clustering can build upon and/or even provide initial matching for certain types of elements of the original operational data 220.

A machine learning model, such as the transformation ML model 212 can be generated such as employing the generation component 213. The transformation ML model 212 can be trained to match data and/or meta data of original operational data to aspects of an updated architecture. More particularly, the transformation ML model 212 can be trained to match one or more of data characteristics, labels, language, data type and/or other representation of one or more elements of the original operational data 220 to one or more characteristics of one or more aspects of the updated architecture. Moreover, the transformation ML model 212 can be trained to recognize sub-elements of an element of operational data (e.g., one or more portions of an element of operational data) and to match the sub-elements to the one or more aspects of an updated architecture. For example, this can be the case where a log of original operational data 220 includes portions applicable and/or correlated to plural aspects of an updated architecture. Initial training data 222 can be employed to initially train the transformation ML model. The initial training data 222 can be provided by an entity, such as an administrating entity.

Figure 4:
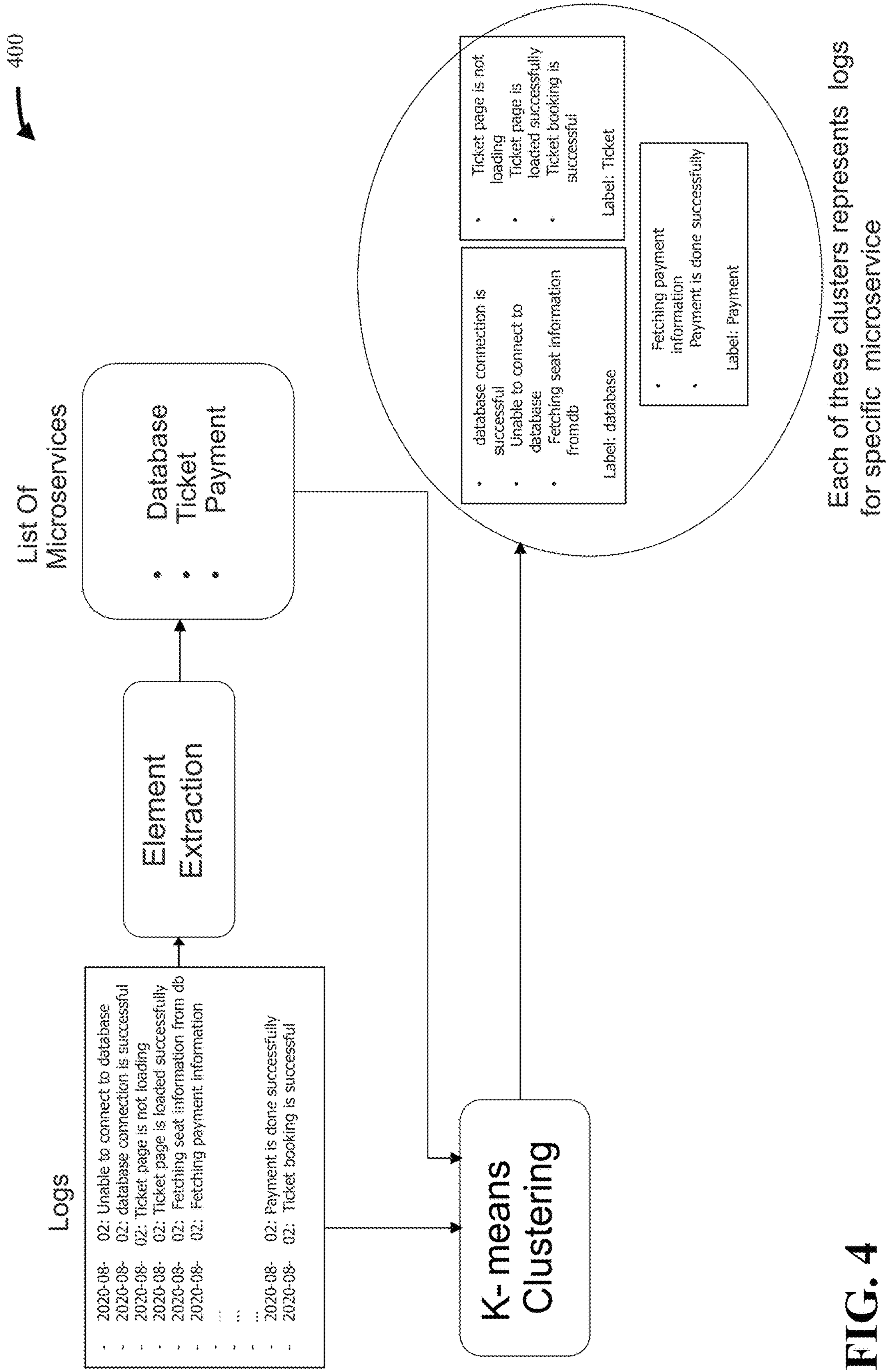
FIG. 4 illustrates a flow diagram of a clustering process employed by the non-limiting system of FIG. 2, in accordance with one or more embodiments described herein.

The clustering, employing the transformation ML model 212, can be element-guided clustering, off-the-shelf clustering and/or another suitable clustering technique. Turning first to FIG. 4, a flow diagram 400 is illustrated providing an example of element-guided clustering relative to an updated architecture including one or more microservices. As illustrated, one or more elements of operational data (e.g., logs) can be extracted relative to an original architecture. Prior to clustering, such as via the one or more resolution techniques described above, one or more elements can be initially matched to one or more microservices. K-means clustering can then be employed, such as by the transformation ML model 212 to copy, move and/or transfer elements of data into one or more clusters representing different aspects of the updated architecture. Here, the different aspects are different microservices, with the clusters representing different logs for the different microservices.

Figure 5:
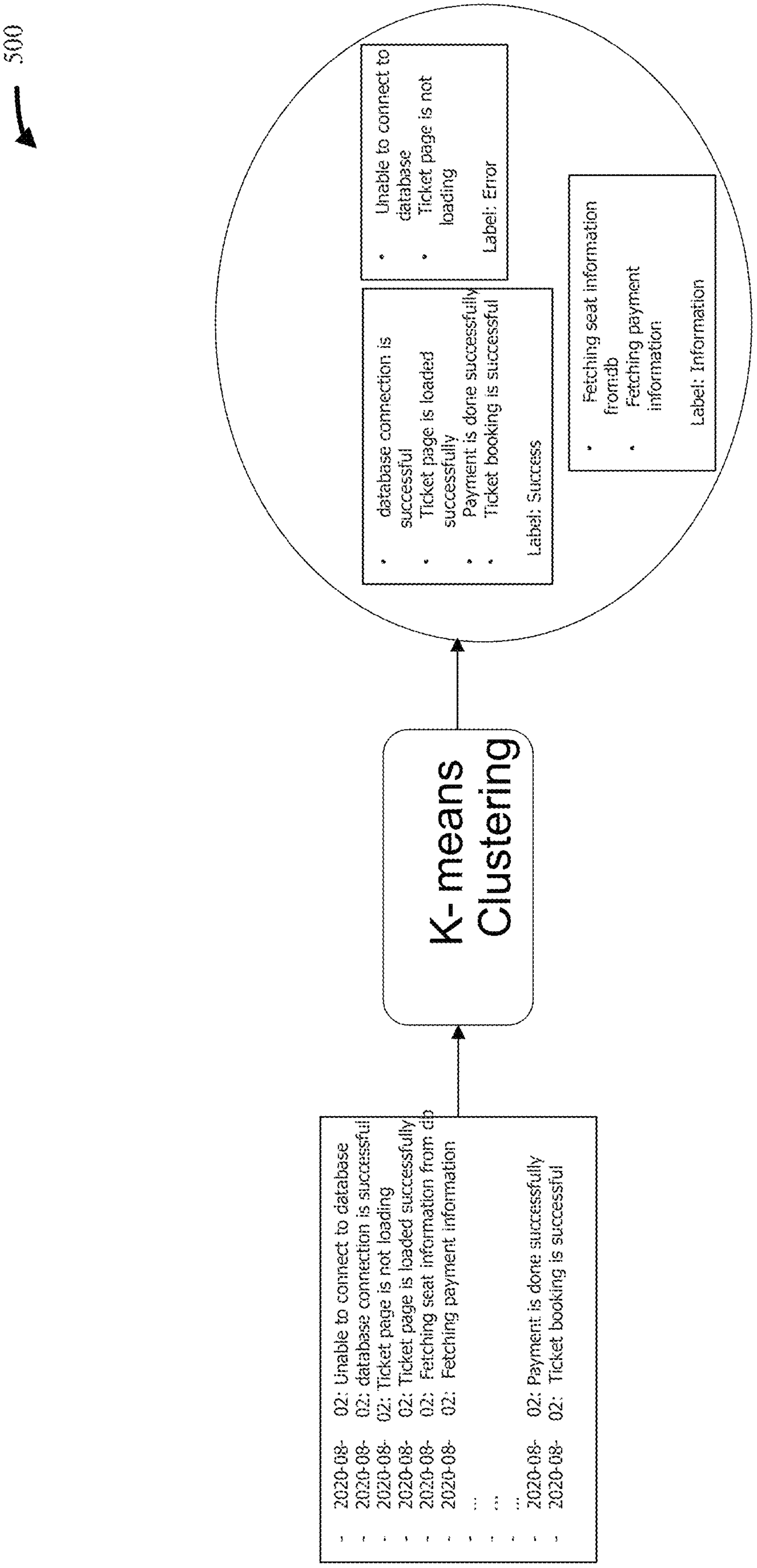
FIG. 5 illustrates a flow diagram of another clustering process employed by the non-limiting system of FIG. 2, in accordance with one or more embodiments described herein.

Turning next to FIG. 5, a flow diagram 500 is illustrated providing an example of off-the-shelf clustering relative to an updated architecture including one or more microservices. Off-the-shelf clustering can be less-guided than the element-guided clustering, and thus can result in one or more inaccuracies, which can be acceptable and/or unacceptable. That is, off-the-shelf clustering can employ generic keywords. As illustrated, one or more elements of operational data (e.g., logs) can be extracted relative to an original architecture. Where resolution techniques are not performed, or are not successful, viable and/or feasible, such as relative to tickets, K-means clustering can be employed, such as by the transformation ML model 212 to copy, move and/or transfer elements of data into one or more clusters representing different aspects of the updated architecture. Here, the different aspects are different microservices, with the clusters representing different logs for the different microservices.

In addition to the above-described processes, a feedback component 214 can receive and/or retrieve entity feedback 226. The entity feedback 226 can be provided by an entity, such as an entity controlling, viewing, reviewing and/or conducting a quality check of the data transformation performed by the data transformation system 202. The entity feedback 226 can include, feedback provided by a human and/or other entity. The feedback 226 can include one or more match corrections, match additions, match clarifications and/or other requested change. The feedback 226 can be collected to continuously improve upon the accuracy, speed and/or efficiency of the transformation ML model 212. That is, the feedback 226 can be employed by the training component 216 to train the transformation ML model 212.

Turning next to the training component 216, comparison data and/or metadata from the matching performed by the transformation component 208 can be stored at one or more databases, knowledge databases and/or lookup tables. Any suitable location of storage accessible by the training component 216 and/or transformation component 208 is envisioned. The training component 216 can employ the comparison data and/or metadata, and/or data/metadata relative to the feedback 226, to periodically re-train the transformation ML model 212, such as after an iteration of data transformation relative to an updated architecture.

Further, it also is to be appreciated that one or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively transform one or more elements of operational data in the time that one or more embodiments described herein can facilitate this process. And, neither can the human mind nor a human with pen and paper electronically transform one or more elements of operational data as conducted by one or more embodiments described herein.

Figure 6:
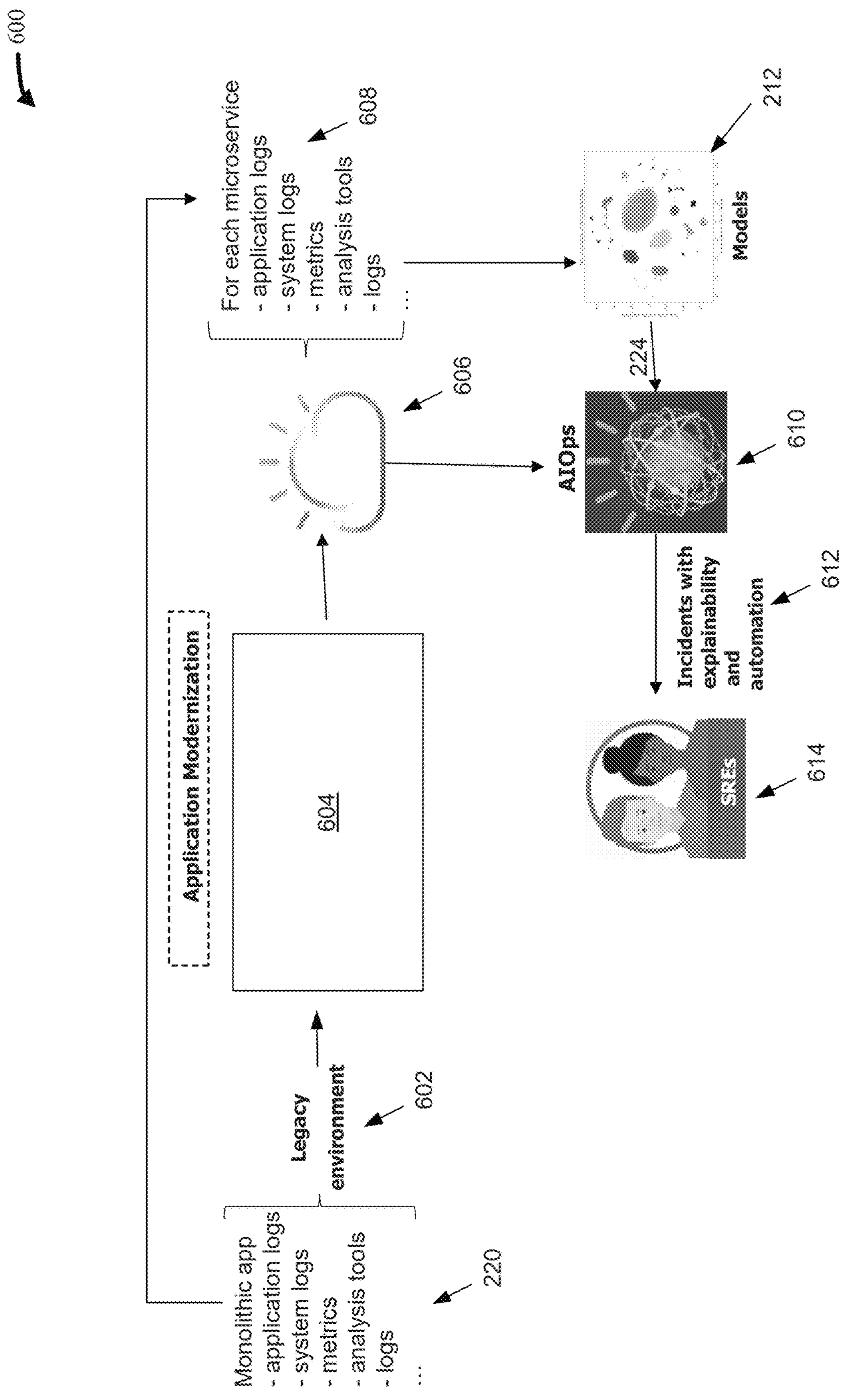
FIG. 6 illustrates a flow diagram of another process facilitated by the non-limiting system of FIG. 2, in accordance with one or more embodiments described herein.

Turning next to FIG. 6, a flow diagram 600 is provided illustrating a data transformation performed by the non-limiting system 200 and/or data transformation system 202. As illustrated, original operational data 220 can be present relative to a legacy environment 602. The legacy environment 602 and/or an architecture defining the legacy environment 602 can be modernized and/or otherwise updated to an updated architecture 604. The updated architecture 604 can employ one or more of cloud native management 606 and/or microservices 608. Data transformation, such as via the data transformation system 202 can be employed, including extraction, resolution, clustering, decomposition and/or other techniques described above. A ML model, such as the transformation ML model 212 can be employed. Updated operational data 224 can be output.

In addition to the description provided above, one or more AI operations 610 can be employed, such as employing the cloud native management and/or environment 606 to analyze the output updated operational data 224. As a result, one or more results 612, such as including incidents with explainability and automation can be provided to one or more SRE's (site reliability engineers) 614 or other entities. That is, the updated operational data 224 that has been transformed relative to the updated architecture 604 can be employed for problem-solving and/or issue-spotting relative to the updated architecture. The updated operational data 224 can be employed as historical data, training data for the AI operations, and/or as additional data points for one or more root cause analyses, for example. Updated operational data 224 can be used to explain incidents or to resolve incidents. It will be appreciated that the AI operations can be performed by one or more components of the non-limiting system 200, such as the processor 206, and/or by one or more components external to the non-limiting system 200.

Figure 7:
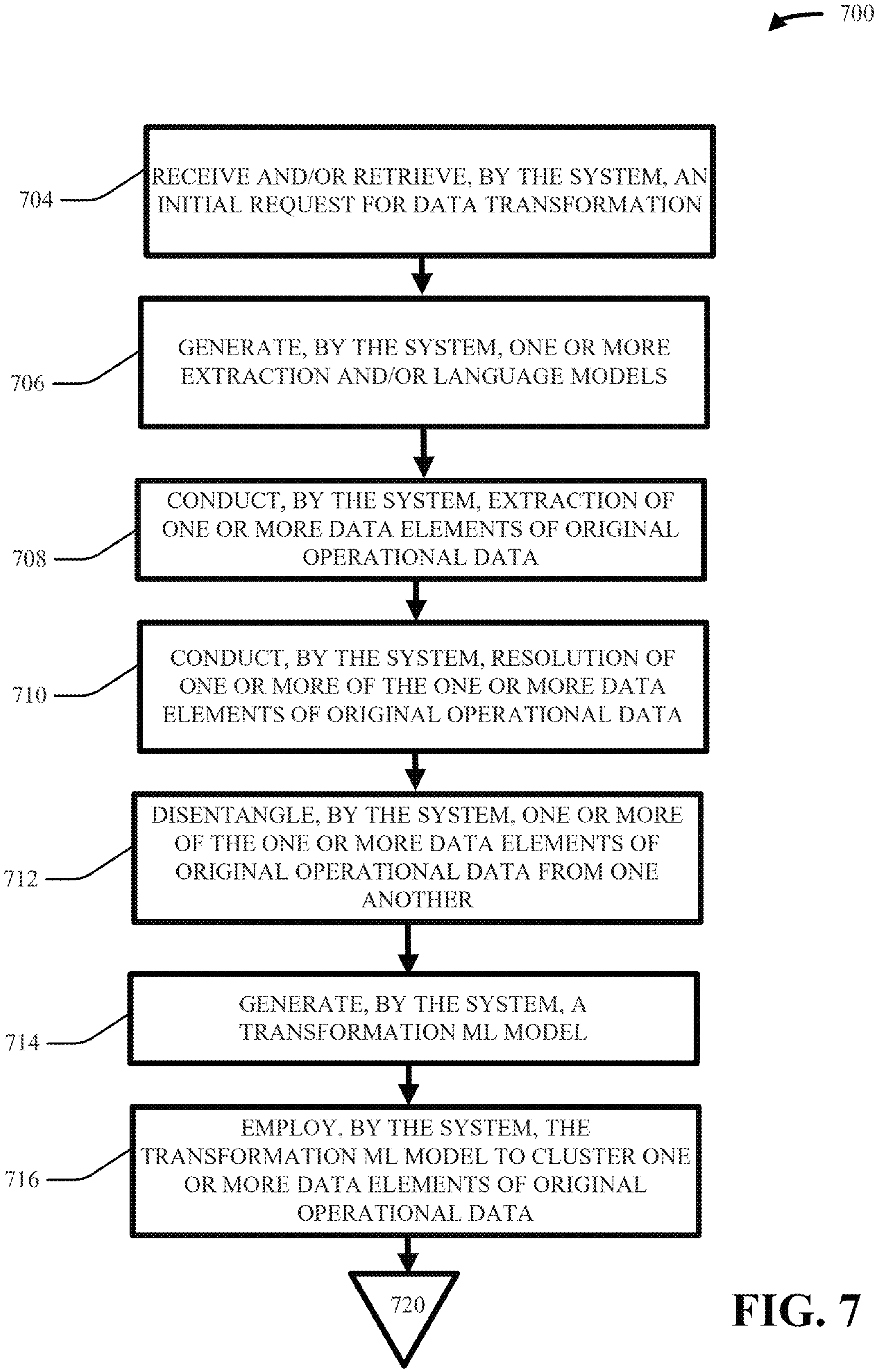
FIG. 7 illustrates a flow diagram of an example, non-limiting computer-implemented method that can facilitate a process to transform original operational data into updated operational data, in accordance with one or more embodiments described herein.
Figure 8:
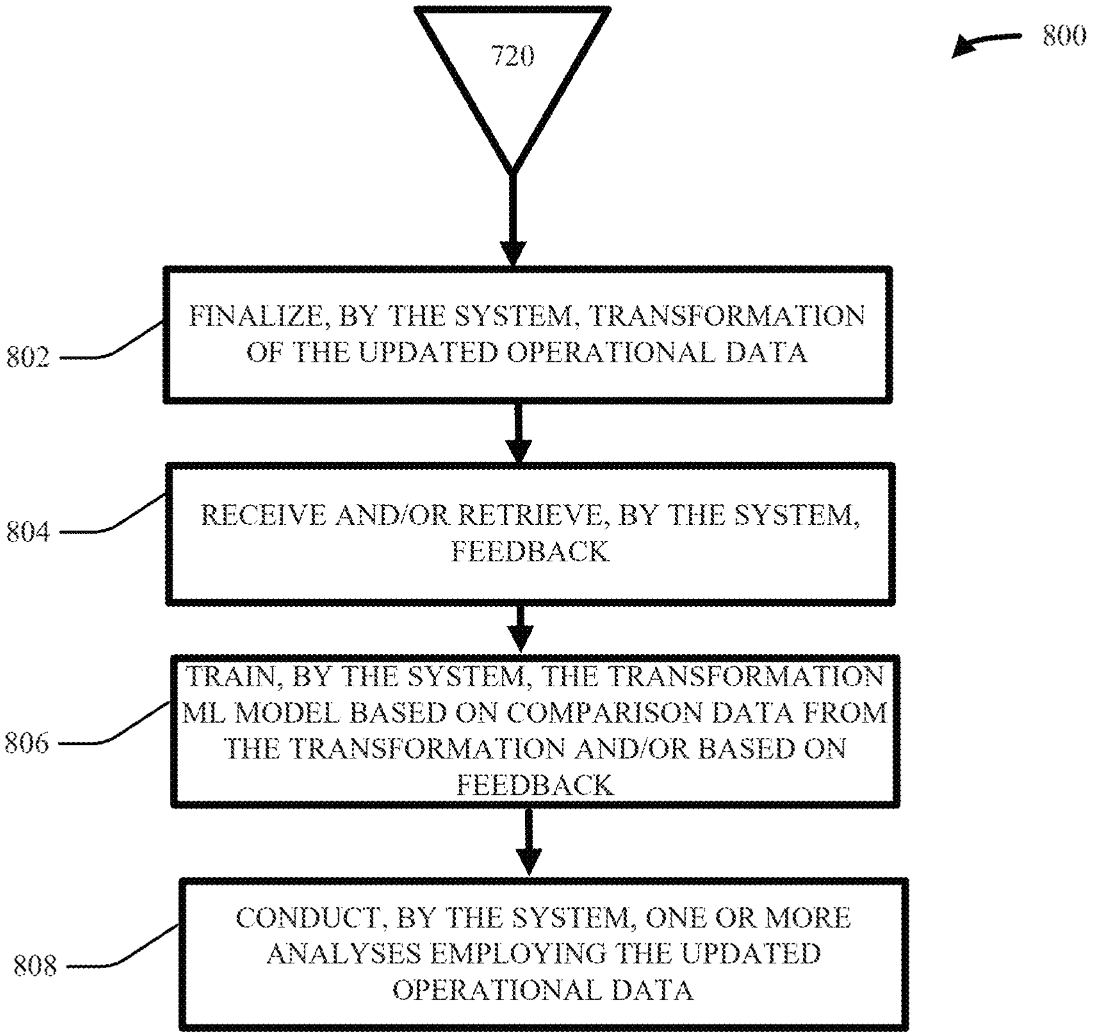
FIG. 8 illustrates a continuation of the flow diagram of FIG. 7, of an example, non-limiting computer-implemented method that can facilitate a process to transform original operational data into updated operational data, in accordance with one or more embodiments described herein.

Turning now to FIGS. 7 and 8, these figures together illustrate a flow diagram of an example, non-limiting computer-implemented method 700 that can facilitate a process to transform original operational data into updated operational data, in accordance with one or more embodiments described herein with respect to the non-limiting system 200. It will be appreciated that while the computer-implemented method 700 is described relative to the non-limiting system 200, the computer-implemented method 700 can be applicable also to the non-limiting system 100. Repetitive description of like elements and/or processes employed in respective embodiments is omitted for sake of brevity.

Looking first to 704 at FIG. 7, the computer-implemented method 700 can comprise receiving and/or retrieving, by the system (e.g., determination component 207), an initial request (e.g., request 203) for data transformation.

At 706, the computer-implemented method 700 can comprise generating, by the system (e.g., generation component 213), one or more extraction and/or language models.

At 708, the computer-implemented method 700 can comprise conducting, by the system (e.g., transformation component 208) extraction of one or more data elements of original operational data (e.g., original operational data 220).

At 710, the computer-implemented method 700 can comprise conducting, by the system (e.g., transformation component 208), resolution of one or more of the one or more data elements of original operational data (e.g., original operational data 220).

At 712, the computer-implemented method 700 can comprise disentangling, by the system (e.g., transformation component 208), one or more of the one or more data elements of original operational data (e.g., original operational data 220).

At 714, the computer-implemented method 700 can comprise generating, by the system (e.g., transformation component 208), a transformation ML model (e.g., transformation ML model 212).

At 716, the computer-implemented method 700 can comprise employing, by the system (e.g., transformation component 208), the transformation ML model (e.g., transformation ML model 212) to cluster one or more of the one or more data elements and/or a different one or more data elements of original operational data (e.g., original operational data 220).

Next, FIG. 8 illustrates a continuation of the method 700 partially illustrated at the flow diagram of FIG. 7. At FIG. 8, the method 700 of FIG. 7 is continued, represented by the continuation triangle 720 illustrated at each of FIGS. 7 and 8. Repetitive description of like elements and/or processes employed in respective embodiments is omitted for sake of brevity.

At 802, the computer-implemented method 700 can comprise finalizing, by the system (e.g., transformation component 208) transformation of the updated operational data 224, which finalization can include any one or more of duplicating, copying, transferring and/or other process of the clustered and/or non-clustered data, now relative to the updated architecture.

At 804, the computer-implemented method 700 can comprise receiving and/or retrieving, by the system (e.g., feedback component 214), one or more updated entity feedbacks (e.g., entity feedback 226).

At 806, the computer-implemented method 700 can comprise training, by the system (e.g., training component 216), the transformation ML model (e.g., transformation ML model 212) based on comparison data from the transformation of the original operational data (e.g., original operational data 220) and/or based on the feedback (e.g., feedback 226).

At 808, the computer-implemented method 700 can comprise, conducting, by the system (e.g., non-limiting system 200 and/or processor 206), one or more analyses employing the updated operational data (e.g., updated operational data 224).

For simplicity of explanation, the computer-implemented methodologies provided herein are depicted and/or described as a series of acts. It is to be understood and appreciated that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented methodologies in accordance with the described subject matter. In addition, those skilled in the art will understand and appreciate that the computer-implemented methodologies could alternatively be represented as a series of interrelated states via a state diagram or events. Additionally, it should be further appreciated that the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any computer-readable device or storage media.

In summary, the one or more embodiments described herein can enable transformation of original data from a first architecture, such as operational data and/or such as from a first legacy application, to updated data of and/or for use by and/or with a second architecture, such as updated operational data relative to a second updated and/or modernized application. Accordingly, the one or more embodiments described herein can account for one or more deficiencies with existing modernization approaches for modernization of legacy application to updated, new and/or modernized applications and/or versions thereof.

An advantage of such systems, computer-implemented methods and/or computer program products, as described in the one or more embodiments provided above, can be fast and efficient problem-solving and/or issue-spotting relative to an updated or new architecture based on employment of transformed historical data relative to a historical or legacy version of the updated or new architecture. Indeed, transformation of a legacy architecture to a new or updated (e.g., modernized) architecture often does not likewise provide for transformation of operational data associated with the legacy architecture. Absent such transformation of the operational data, an entity using or operating on the updated or new architecture can be at a loss for understanding of one or more problems and/or issues.

That is, one or more problems associated with the legacy architecture can still be present in one or more forms at the updated architecture, and/or one or more new problems associated with the updated architecture can have a basis and/or relation to the respective previous legacy architecture. Accordingly, learning from past activities, such as via the updated operational data, can assist one or more entities associated with an updated architecture to resolve issues and/or concerns relative to the new or updated architecture more easily, quickly and/or efficiently.

Furthermore, the operational data transformed from the previous architecture to the updated architecture can be employed to train one or more machine learning models and/or to guide one or more AI-based processes and/or operations relative to the updated architecture. Absent transformation of the legacy operational data, this training data will be unavailable or unattainable.

In view of the one or more embodiments, a practical application of the data transformation systems described herein is that data relating to a previous and/or legacy architecture can be employed, used by, referenced relative to and/or generally transformed for consistency with an updated and/or modernized architecture.

In one example, as one real-world result, error legs and data storage/access parameters previously employed by a legacy application, such as a monolithic application, can be transformed for use by and/or relative to an updated application, such as a cloud native application and/or an application employing one or more microservices and/or other service aspects. This updated data can be employed to facilitate consistent and error-reduced outputs from one or more microservices to one or more real-world components, such as consumers, sellers, purchase websites and/or the like. In one or more examples, updated data can be segmented data, where individual segments can correspond to one or more microservices.

Furthermore, future operations of data transformation can be facilitated via the machine learning and training employed by the data transformation systems described herein. That is, as the data transformation systems described herein continue to be trained, future data transformation operations can be facilitated more quickly and/or with less entity input to account for one or more unknowns and/or errors in the transformations. This inherently can allow for less iterative feedback being provided relative to future data transformations, and thus respectively shorter transformation reviews.

Moreover, it will be appreciated that a data transformation system described herein can be implemented in one or more domains to enable scaled transformation executions. Indeed, use of a data transformation system as described herein can be scalable, such as where a data transformation system can perform at least one transformation of original operational data at least partially in parallel at a same time with another transformation of different original transformation data, relative to a same or different primary architecture and/or secondary/updated architecture.

The systems and/or devices have been (and/or will be further) described herein with respect to interaction between one or more components. It should be appreciated that such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

It is to be appreciated that one or more embodiments described herein are inherently and/or inextricably tied to computer technology and cannot be implemented outside of a computing environment. For example, one or more processes performed by one or more embodiments described herein can more efficiently, and even more feasibly, provide program and/or program instruction execution as compared to existing systems and/or techniques. Systems, computer-implemented methods and/or computer program products facilitating performance of these processes are of great utility in the field of non-monolithic architectures, such as cloud native and/or microservice architectures and cannot be equally practicably implemented in a sensible way outside of a computing environment.

It also is to be appreciated that one or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively transform one or more elements of operational data in the time that one or more embodiments described herein can facilitate this process. And, neither can the human mind nor a human with pen and paper electronically transform one or more elements of operational data as conducted by one or more embodiments described herein.

In one or more embodiments, one or more of the processes described herein can be performed by one or more specialized computers (e.g., a specialized processing unit, a specialized classical computer, a specialized quantum computer, a specialized hybrid classical/quantum system and/or another type of specialized computer) to execute defined tasks related to the one or more technologies describe above. One or more embodiments described herein and/or components thereof can be employed to solve new problems that arise through advancements in technologies mentioned above, employment of quantum computing systems, cloud computing systems, computer architecture and/or another technology.

One or more embodiments described herein can be fully operational towards performing one or more other functions (e.g., fully powered on, fully executed and/or another function) while also performing the one or more operations described herein.

Figure 9:
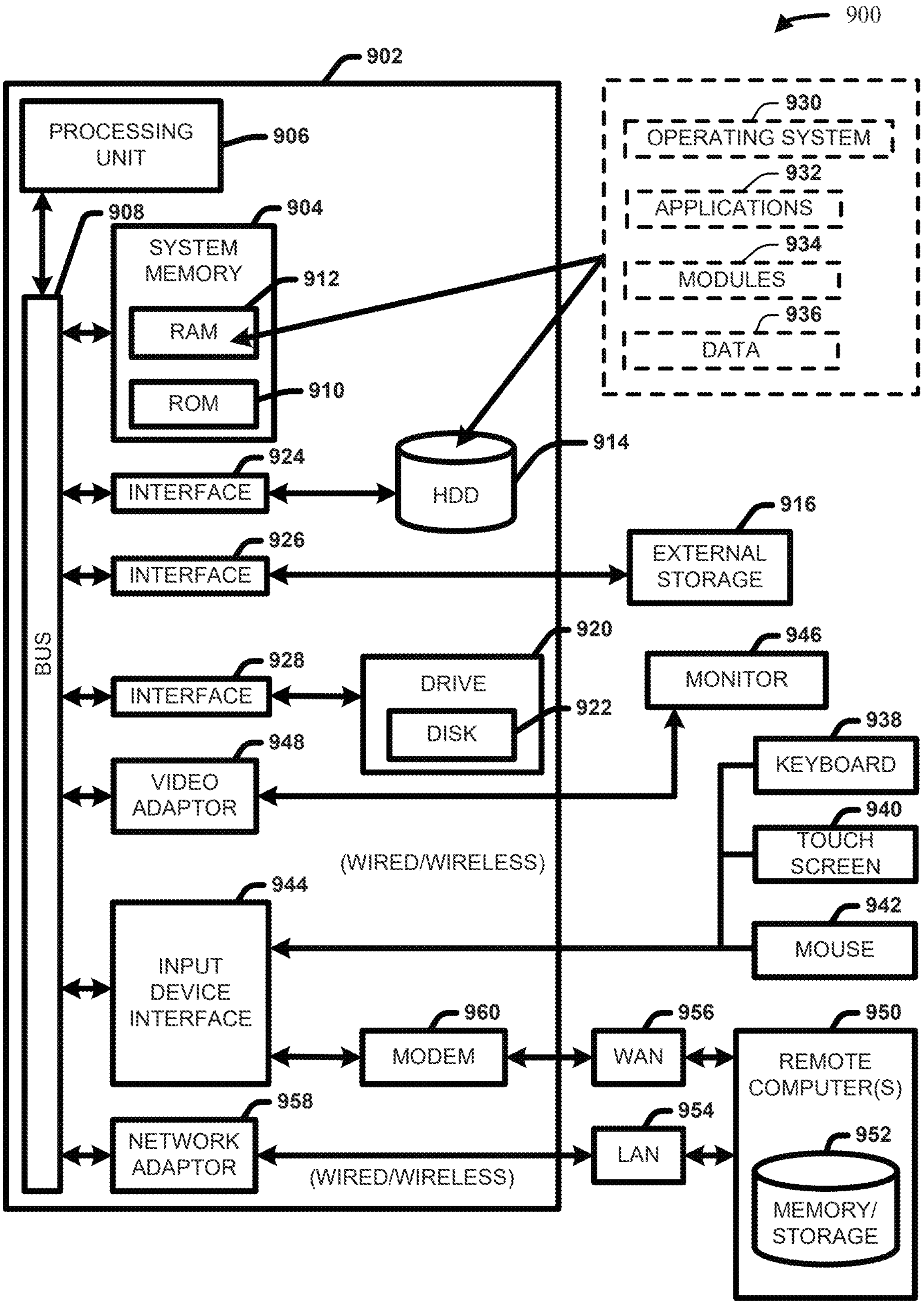
FIG. 9 illustrates a block diagram of an example, non-limiting operating environment in which one or more embodiments described herein can be facilitated.
Figure 10:
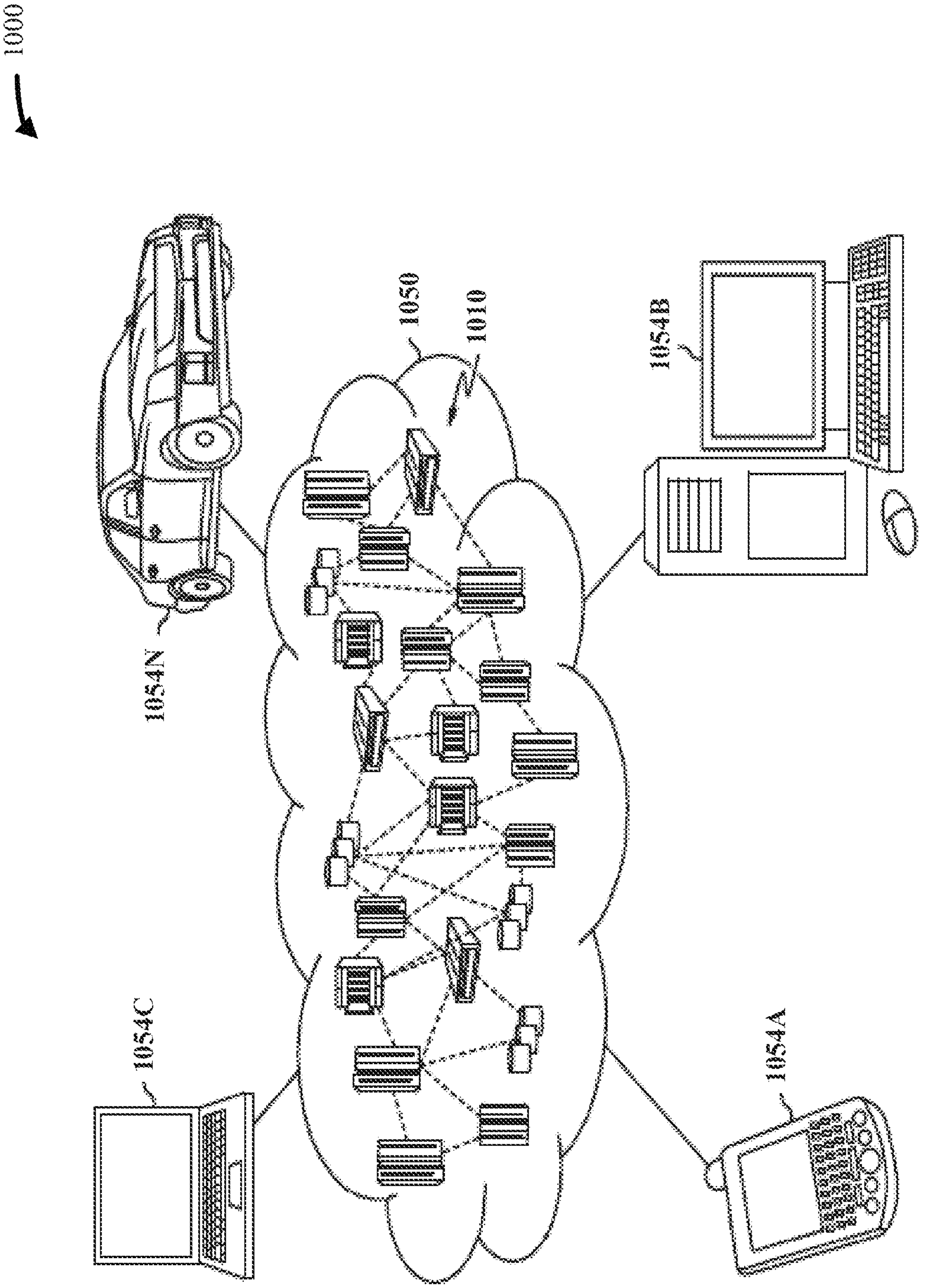
FIG. 10 illustrates a block diagram of an example, non-limiting cloud computing environment in accordance with one or more embodiments described herein.
Figure 11:
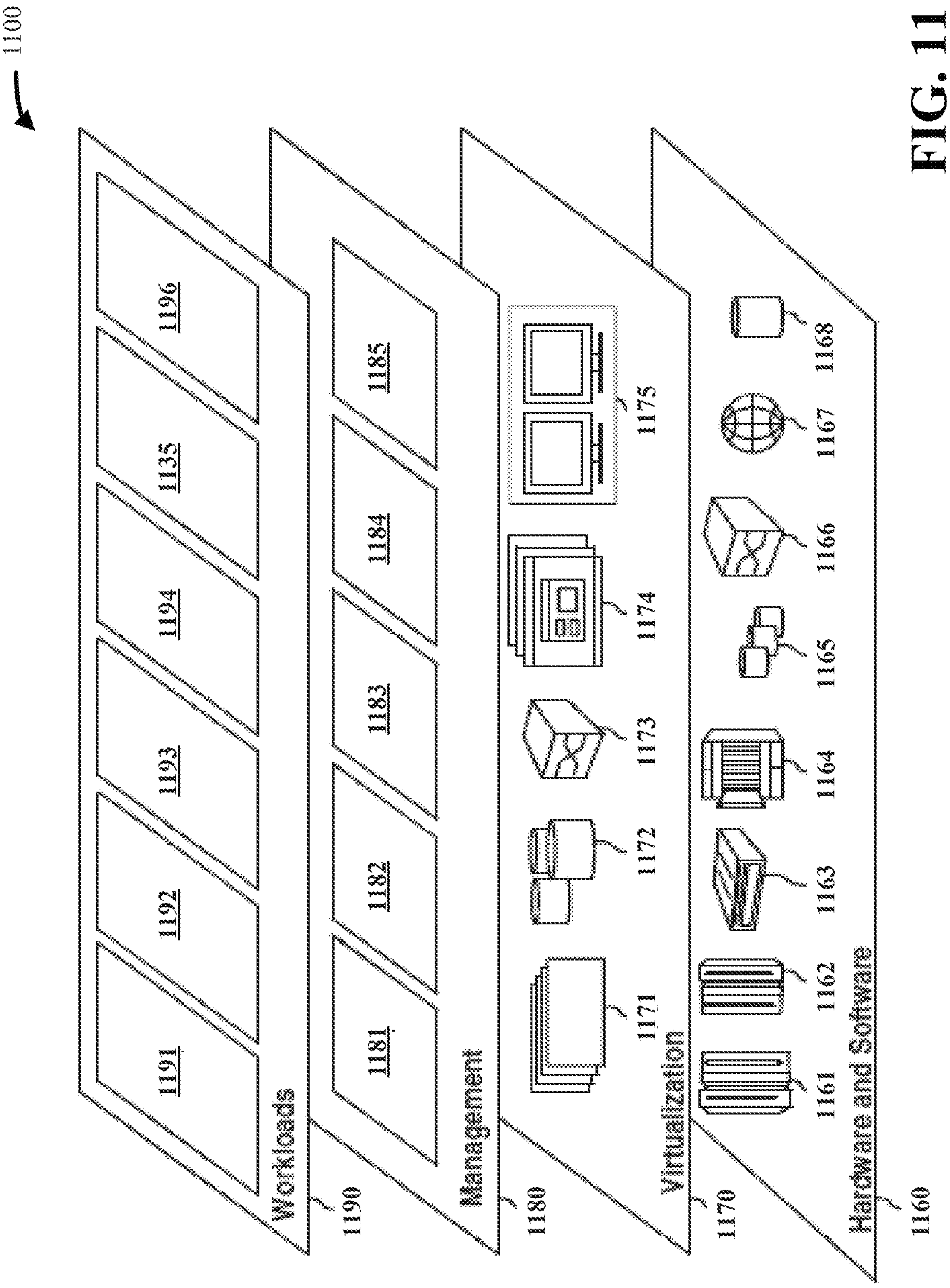
FIG. 11 illustrates a block diagram of a plurality of example, non-limiting abstraction model layers, in accordance with one or more embodiments described herein.

Turning next to FIGS. 9-11, a detailed description is provided of additional context for the one or more embodiments described herein at FIGS. 1-8.

FIG. 9 and the following discussion are intended to provide a brief, general description of a suitable operating environment 900 in which one or more embodiments described herein at FIGS. 1-8 can be implemented. For example, one or more components and/or other aspects of embodiments described herein can be implemented in or be associated with, such as accessible via, the operating environment 900. Further, while one or more embodiments have been described above in the general context of computer-executable instructions that can run on one or more computers, those skilled in the art will recognize that one or more embodiments also can be implemented in combination with other program modules and/or as a combination of hardware and software.

Generally, program modules include routines, programs, components, data structures and/or the like, that perform particular tasks and/or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and/or the like, each of which can be operatively coupled to one or more associated devices.

Computing devices typically include a variety of media, which can include computer-readable storage media, machine-readable storage media and/or communications media, which two terms are used herein differently from one another as follows. Computer-readable storage media or machine-readable storage media can be any available storage media that can be accessed by the computer and includes both volatile and nonvolatile media, removable and non-removable media. By way of example, but not limitation, computer-readable storage media and/or machine-readable storage media can be implemented in connection with any method or technology for storage of information such as computer-readable and/or machine-readable instructions, program modules, structured data and/or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) and/or other optical disk storage, magnetic cassettes, magnetic tape, magnetic disk storage and/or other magnetic storage devices, solid state drives or other solid state storage devices and/or other tangible and/or non-transitory media which can be used to store specified information. In this regard, the terms "tangible" or "non-transitory" herein as applied to storage, memory and/or computer-readable media, are to be understood to exclude only propagating transitory signals per se as modifiers and do not relinquish rights to all standard storage, memory and/or computer-readable media that are not only propagating transitory signals per se.

Computer-readable storage media can be accessed by one or more local or remote computing devices, e.g., via access requests, queries and/or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, but not limitation, communication media can include wired media, such as a wired network, direct-wired connection and/or wireless media such as acoustic, RF, infrared and/or other wireless media.

With reference again to FIG. 9, the example operating environment 900 for implementing one or more embodiments of the aspects described herein can include a computer 902, the computer 902 including a processing unit 906, a system memory 904 and/or a system bus 908. It will be appreciated that one or more aspects of the system memory 904 or processing unit 906 can be applied to memories such as 104 and/or 204 and/or to processors such as 106 and/or 206, respectively of the non-limiting systems 100 and/or 200. It also will be appreciated that the system memory 904 can be implemented in combination with and/or alternatively to memories such as 104 and/or 204. Likewise, it also will be appreciated that the processing unit 906 can be implemented in combination with and/or alternatively to processors such as 106 and/or 206.

Memory 904 can store one or more computer and/or machine readable, writable and/or executable components and/or instructions that, when executed by processing unit 906 (e.g., a classical processor, a quantum processor and/or like processor), can facilitate performance of operations defined by the executable component(s) and/or instruction (s). For example, memory 904 can store computer and/or machine readable, writable and/or executable components and/or instructions that, when executed by processing unit 906, can facilitate execution of the one or more functions described herein relating to non-limiting systems 100 and/or 200 and/or data transformation systems such as 102 and/or 202, as described herein with or without reference to the one or more figures of the one or more embodiments.

Memory 904 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM) and/or the like) that can employ one or more memory architectures.

Processing unit 906 can comprise one or more types of processors and/or electronic circuitry (e.g., a classical processor, a quantum processor and/or like processor) that can implement one or more computer and/or machine readable, writable and/or executable components and/or instructions that can be stored at memory 904. For example, processing unit 906 can perform one or more operations that can be specified by computer and/or machine readable, writable and/or executable components and/or instructions including, but not limited to, logic, control, input/output (I/O), arithmetic and/or the like. In one or more embodiments, processing unit 906 can be any of one or more commercially available processors. In one or more embodiments, processing unit 906 can comprise one or more central processing unit, multi-core processor, microprocessor, dual microprocessors, microcontroller, System on a Chip (SOC), array processor, vector processor, quantum processor and/or another type of processor. The examples of processing unit 906 can be employed to implement one or more embodiments described herein.

The system bus 908 can couple system components including, but not limited to, the system memory 904 to the processing unit 906. The system bus 908 can comprise one or more types of bus structure that can further interconnect to a memory bus (with or without a memory controller), a peripheral bus and/or a local bus using one or more of a variety of commercially available bus architectures. The system memory 904 can include ROM 910 and/or RAM 912. A basic input/output system (BIOS) can be stored in a non-volatile memory such as ROM, erasable programmable read only memory (EPROM) and/or EEPROM, which BIOS contains the basic routines that help to transfer information among elements within the computer 902, such as during startup. The RAM 912 can include a high-speed RAM, such as static RAM for caching data.

The computer 902 can include an internal hard disk drive (HDD) 914 (e.g., EIDE, SATA), one or more external storage devices 916 (e.g., a magnetic floppy disk drive (FDD), a memory stick or flash drive reader, a memory card reader and/or the like) and/or a drive 920, e.g., such as a solid state drive or an optical disk drive, which can read or write from a disk 922, such as a CD-ROM disc, a DVD, a BD and/or the like. Additionally, and/or alternatively, where a solid state drive is involved, disk 922 could not be included, unless separate. While the internal HDD 914 is illustrated as located within the computer 902, the internal HDD 914 can also be configured for external use in a suitable chassis (not shown). Additionally, while not shown in operating environment 900, a solid state drive (SSD) can be used in addition to, or in place of, an HDD 914. The HDD 914, external storage device(s) 916 and drive 920 can be connected to the system bus 908 by an HDD interface 924, an external storage interface 926 and a drive interface 928, respectively. The HDD interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, can also be used in the example operating environment, and/or that any such storage media can contain computer-executable instructions for performing the methods described herein.

A number of program modules can be stored in the drives and RAM 912, including an operating system 930, one or more applications 932, other program modules 934 and/or program data 936. All or portions of the operating system, applications, modules and/or data can also be cached in the RAM 912. The systems and/or methods described herein can be implemented utilizing one or more commercially available operating systems and/or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In a related embodiment, operating system 930 can comprise one virtual machine (VM) of multiple VMs hosted at computer 902. Furthermore, operating system 930 can provide runtime environments, such as the JAVA runtime environment or the .NET framework, for applications 932. Runtime environments are consistent execution environments that can allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and/or settings for an application.

Further, computer 902 can be enabled with a security module, such as a trusted processing module (TPM). For instance, with a TPM, boot components hash next in time boot components and wait for a match of results to secured values before loading a next boot component. This process can take place at any layer in the code execution stack of computer 902, e.g., applied at application execution level and/or at operating system (OS) kernel level, thereby enabling security at any level of code execution.

An entity can enter and/or transmit commands and/or information into the computer 902 through one or more wired/wireless input devices, e.g., a keyboard 938, a touch screen 940 and/or a pointing device, such as a mouse 942. Other input devices (not shown) can include a microphone, an infrared (IR) remote control, a radio frequency (RF) remote control and/or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint and/or iris scanner, and/or the like. These and other input devices can be connected to the processing unit 906 through an input device interface 944 that can be coupled to the system bus 908, but can be connected by other interfaces, such as a parallel port, an IEEE 1394 serial port, a game port, a USB port, an IR interface, a BLUETOOTH® interface and/or the like.

A monitor 946 or other type of display device can be alternatively and/or additionally connected to the system bus 908 via an interface, such as a video adapter 948. In addition to the monitor 946, a computer typically includes other peripheral output devices (not shown), such as speakers, printers and/or the like.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device and/or other common network node, and typically includes many or all of the elements described relative to the computer 902, although, for purposes of brevity, only a memory/storage device 952 is illustrated. Additionally, and/or alternatively, the computer 902 can be coupled (e.g., communicatively, electrically, operatively, optically and/or the like) to one or more external systems, sources and/or devices (e.g., classical and/or quantum computing devices, communication devices and/or like device) via a data cable (e.g., High-Definition Multimedia Interface (HDMI), recommended standard (RS) 232, Ethernet cable and/or the like).

In one or more embodiments, a network can comprise one or more wired and/or wireless networks, including, but not limited to, a cellular network, a wide area network (WAN) (e.g., the Internet), or a local area network (LAN). For example, one or more embodiments described herein can communicate with one or more external systems, sources and/or devices, for instance, computing devices (and vice versa) using virtually any specified wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol and/or other proprietary and/or non-proprietary communication protocols. In a related example, one or more embodiments described herein can include hardware (e.g., a central processing unit (CPU), a transceiver, a decoder, quantum hardware, a quantum processor and/or the like), software (e.g., a set of threads, a set of processes, software in execution, quantum pulse schedule, quantum circuit, quantum gates and/or the like) and/or a combination of hardware and/or software that facilitates communicating information among one or more embodiments described herein and external systems, sources and/or devices (e.g., computing devices, communication devices and/or the like).

The logical connections depicted include wired/wireless connectivity to a local area network (LAN) 954 and/or larger networks, e.g., a wide area network (WAN) 956. LAN and WAN networking environments can be commonplace in offices and companies and can facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired and/or wireless communication to the LAN 954, which can also include a wireless access point (AP) disposed thereon for communicating with the adapter 958 in a wireless mode.

When used in a WAN networking environment, the computer 902 can include a modem 960 and/or can be connected to a communications server on the WAN 956 via other means for establishing communications over the WAN 956, such as by way of the Internet. The modem 960, which can be internal and/or external and a wired and/or wireless device, can be connected to the system bus 908 via the input device interface 944. In a networked environment, program modules depicted relative to the computer 902 or portions thereof can be stored in the remote memory/storage device 952. It will be appreciated that the network connections shown are merely exemplary and one or more other means of establishing a communications link among the computers can be used.

When used in either a LAN or WAN networking environment, the computer 902 can access cloud storage systems or other network-based storage systems in addition to, and/or in place of, external storage devices 916 as described above, such as but not limited to, a network virtual machine providing one or more aspects of storage and/or processing of information. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, such as with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices and/or entities operatively disposed in wireless communication, e.g., a printer, scanner, desktop and/or portable computer, portable data assistant, communications satellite, telephone and/or any piece of equipment or location associated with a wirelessly detectable tag (e.g., a kiosk, news stand, store shelf and/or the like). This can include Wireless Fidelity (Wi-Fi) and BLUETOOTH® wireless technologies. Thus, the communication can be a predefined structure as with a conventional network or simply an ad hoc communication between at least two devices.

The illustrated embodiments described herein can be practiced in distributed computing environments (e.g., cloud computing environments), such as described below with respect to FIG. 15, where certain tasks are performed by remote processing devices that are linked through a communications network. In a distributed computing environment, program modules can be located both in local and/or remote memory storage devices.

For example, one or more embodiments described herein and/or one or more components thereof can employ one or more computing resources of the cloud computing environment 1550 described below with reference to FIG. 15, and/or with reference to the one or more functional abstraction layers (e.g., quantum software and/or the like) described below with reference to FIG. 16, to execute one or more operations in accordance with one or more embodiments described herein. For example, cloud computing environment 1550 and/or one or more of the functional abstraction layers 1660, 1670, 1680 and/or 1690 can comprise one or more classical computing devices (e.g., classical computer, classical processor, virtual machine, server and/or the like), quantum hardware and/or quantum software (e.g., quantum computing device, quantum computer, quantum processor, quantum circuit simulation software, superconducting circuit and/or the like) that can be employed by one or more embodiments described herein and/or components thereof to execute one or more operations in accordance with one or more embodiments described herein. For instance, one or more embodiments described herein and/or components thereof can employ such one or more classical and/or quantum computing resources to execute one or more classical and/or quantum: mathematical function, calculation and/or equation; computing and/or processing script; algorithm; model (e.g., artificial intelligence (AI) model, machine learning (ML) model and/or like model); and/or other operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines and/or services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can specify location at a higher level of abstraction (e.g., country, state and/or datacenter).

Rapid elasticity: capabilities can be rapidly and elastically provisioned, in one or more cases automatically, to quickly scale out and rapidly released to quickly scale in. To the consumer, the capabilities available for provisioning can appear to be unlimited and can be purchased in any quantity at any time.

Measured service: cloud systems automatically control and optimize resource use by leveraging a metering capability at one or more levels of abstraction appropriate to the type of service (e.g., storage, processing, bandwidth and/or active user accounts). Resource usage can be monitored, controlled and/or reported, providing transparency for both the provider and consumer of the utilized service.

Service Models are as follows:

Software as a Service (Saas): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage and/or individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems and/or storage, but has control over the deployed applications and possibly application hosting environment configurations.

Infrastructure as a Service (IaaS): the capability provided to the consumer is to provision processing, storage, networks and/or other fundamental computing resources where the consumer can deploy and run arbitrary software, which can include operating systems and applications. The consumer does not manage or control the underlying cloud infrastructure but has control over operating systems, storage, deployed applications and/or possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy and/or compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community or public) that remain unique entities but are bound together by standardized or proprietary technology that enables data and application portability (e.g., cloud bursting for load-balancing among clouds).

A cloud computing environment is service oriented with a focus on statelessness, low coupling, modularity and/or semantic interoperability. At the heart of cloud computing is an infrastructure that includes a network of interconnected nodes.

Moreover, the non-limiting systems 100, 300 and/or 400 and/or the example operating environment 900 can be associated with and/or be included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system, a high availability server system (e.g., a Telecom server system), a Web server system, a file server system, a data server system, a disk array system, a powered insertion board system, a cloud-based system and/or the like. In accordance therewith, non-limiting systems 100, 300 and/or 400 and/or example operating environment 900 can be employed to use hardware and/or software to solve problems that are highly technical in nature, that are not abstract and/or that cannot be performed as a set of mental acts by a human.

Referring now to details of one or more aspects illustrated at FIG. 10, the illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C and/or automobile computer system 1054N can communicate. Although not illustrated in FIG. 10, cloud computing nodes 1010 can further comprise a quantum platform (e.g., quantum computer, quantum hardware, quantum software and/or the like) with which local computing devices used by cloud consumers can communicate. Cloud computing nodes 1010 can communicate with one another. They can be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that cloud computing nodes 1010 and cloud computing environment 1050 can communicate with any type of computerized device over any type of network and/or network addressable connection (e.g., using a web browser).

Referring now to details of one or more aspects illustrated at FIG. 11, a set 1100 of functional abstraction layers is shown, such as provided by cloud computing environment 1050 (FIG. 10). One or more embodiments described herein can be associated with, such as accessible via, one or more functional abstraction layers described below with reference to FIG. 11 (e.g., hardware and software layer 1160, virtualization layer 1170, management layer 1180 and/or workloads layer 1190). It should be understood in advance that the components, layers and/or functions shown in FIG. 11 are intended to be illustrative only and embodiments described herein are not limited thereto. As depicted, the following layers and/or corresponding functions are provided:

Hardware and software layer 1160 can include hardware and software components. Examples of hardware components include: mainframes 1161; RISC (Reduced Instruction Set Computer) architecture-based servers 1162; servers 1163; blade servers 1164; storage devices 1165; and/or networks and/or networking components 1166. In one or more embodiments, software components can include network application server software 1167, quantum platform routing software 1168; and/or quantum software (not illustrated in FIG. 11).

Virtualization layer 1170 can provide an abstraction layer from which the following examples of virtual entities can be provided: virtual servers 1171; virtual storage 1172; virtual networks 1173, including virtual private networks; virtual applications and/or operating systems 1174; and/or virtual clients 1175.

In one example, management layer 1180 can provide the functions described below. Resource provisioning 1181 can provide dynamic procurement of computing resources and other resources that can be utilized to perform tasks within the cloud computing environment. Metering and Pricing 1182 can provide cost tracking as resources are utilized within the cloud computing environment, and/or billing and/or invoicing for consumption of these resources. In one example, these resources can include one or more application software licenses. Security can provide identity verification for cloud consumers and/or tasks, as well as protection for data and/or other resources. User (or entity) portal 1183 can provide access to the cloud computing environment for consumers and system administrators. Service level management 1184 can provide cloud computing resource allocation and/or management such that required service levels are met. Service Level Agreement (SLA) planning and fulfillment 1185 can provide pre-arrangement for, and procurement of, cloud computing resources for which a future requirement is anticipated in accordance with an SLA.

Workloads layer 1190 can provide examples of functionality for which the cloud computing environment can be utilized. Non-limiting examples of workloads and functions which can be provided from this layer include: mapping and navigation 1191; software development and lifecycle management 1192; virtual classroom education delivery 1193; data analytics processing 1194; transaction processing 1195; and/or application transformation software 1196.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented in combination with one or more other program modules. Generally, program modules include routines, programs, components, data structures and/or the like that perform particular tasks and/or implement particular abstract data types. Moreover, those skilled in the art will appreciate that the inventive computer-implemented methods can be practiced with other computer system configurations, including single-processor and/or multiprocessor computer systems, mini-computing devices, mainframe computers, as well as computers, hand-held computing devices (e.g., PDA, phone), microprocessor-based or programmable consumer and/or industrial electronics and/or the like. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the one or more embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:

a memory that stores computer executable components; and a processor that executes the computer executable components stored in the memory, wherein the computer executable components comprise:

a determination component configured to receive a request identifying (i) original operational data associated with a first architecture comprising a monolithic application and (ii) an intended second architecture comprising a non-monolithic architecture including a plurality of microservices;

a transformation component configured to:

extract one or more data elements of the original operational data based on one or more rule-based, query-language-based, or language-model-based extraction techniques, resolve the extracted data elements by correlating the extracted data elements to aspects of the second architecture based at least in part on analysis of source code of the second architecture to generate a syntax tree and a logging tree;

disentangle at least a first data element of the original operational data from a second data element based on temporal, spatial, or language-model-based separation;

cluster, using a transformation machine learning model, the resolved and disentangled data elements into clusters corresponding respectively to different microservices of the second architecture; and transform the clustered data elements into updated operational data formatted for use by the respective microservices of the second architecture;

a generation component configured to generate output data for use by the second architecture based on the updated operational data;

a feedback component configured to receive entity feedback comprising at least one of match corrections, match additions, or match clarifications relating to the clustering or transformation; and a training component configured to retrain one or more parameters of the transformation machine learning model based on (i) comparison data between the original operational data and the updated operational data and (ii) the received entity feedback to improve subsequent clustering and transformation operations.

2. The system of claim 1, wherein the transformation component further duplicates the first or the second data element to generate a pair of duplicate elements for inclusion in the updated operational data.

3. The system of claim 1, wherein the training component stores the comparison data, including clustering results, in a knowledge database accessible by the transformation component.

4. The system of claim 1, wherein the training component trains the transformation machine learning model based on the comparison data between the original operational data and the updated operational data, and wherein the transformation component employs the trained transformation machine learning model.

5. The system of claim 1, wherein the transformation component employs one or more data characteristics of the original operational data to corresponding data characteristics of the updated architecture.

6. A computer-implemented method, comprising:

receiving, by a determination component of a data transformation system, a request identifying original operational data associated with a first architecture comprising a monolithic application and an intended second architecture, comprising a non-monolithic architecture including a plurality of microservices;

extracting, by a transformation component, one or more data elements from the original operational data using at least one of rule-based, query-language-based extraction, or language-model-based extraction techniques;

resolving, by the transformation component, the extracted data elements by correlating the extracted data elements to aspects of the second architecture based at least in part on source code analysis of the second architecture to generate a syntax tree and a logging tree;

disentangling, by the transformation component, at least a first data element from a second data element of the original operational data using at least one of temporal separation, spatial separation, or language-model-based separation;

clustering, by the transformation component using a transformation machine learning model, the resolved and disentangled data elements into clusters corresponding respectively to different microservices of the second architecture;

finalizing transformation of the clustered data elements by duplicating, copying, or transferring at least one clustered data element to a respective microservice to generate updated operational data formatted for use by the second architecture;

receiving, by a feedback component, entity feedback comprising at least one of match corrections, match additions, or match clarifications relating to the clustering or transformation; and retraining, by a training component, one or more parameters of the transformation machine learning model based on (i) comparison data between the original operational data and the updated operational data and (ii) the received entity feedback.

7. The computer-implemented method of claim 6, further comprising:

duplicating, by the transformation component, the first or the second data element for transformation to a pair of duplicate elements of the updated operational data.

8. The computer-implemented method of claim 6, further comprising:

storing, by the training component, the comparison data including clustering results in a knowledge database accessible by the transformation component during transformation of operational data.

9. The computer-implemented method of claim 6, further comprising:

training, by the transformation component, the transformation machine learning model based on the comparison data comparing the original operational data and the updated operational data, wherein the trained transformation machine learning model is employed by the transformation component during transformation.

10. The computer-implemented method of wherein the second architecture comprises a non-monolithic architecture that defines an updated application relative to a monolithic application defined by the first architecture.

11. A computer program product facilitating transformation of original operational data into updated operational data, the computer program product comprising a non-transitory computer readable storage medium having program instructions embodied therewith, the program instructions executable by a processor to cause the processor to:

receive, by a determination component, a request identifying (i) original operational data associated with a first architecture comprising a monolithic application and (ii) an intended second architecture comprising a non-monolithic architecture including a plurality of microservices;

generate at least one extraction model or language model for processing the original operational data;

extract, by a transformation component, one or more data elements from the original operational data using at least one of rule-based extraction, query-language-based extraction, or language-model-based extraction techniques;

resolve the extracted data elements by correlating the extracted data elements to aspects of the second architecture based at least in part on source code analysis of the second architecture to generate a syntax tree and a logging tree;

disentangle at least a first data element from a second data element of the original operational data using at least one of temporal separation, spatial separation, or language-model-based separation;

cluster, using a transformation machine learning model, the resolved and disentangled data elements into clusters corresponding respectively to different microservices of the second architecture;

duplicate or transfer at least one clustered data element to more than one microservice where correlation to plural aspects of the second architecture is established, thereby generating updated operational data formatted for use by the respective microservices; and retrain one or more parameters of the transformation machine learning model based on (i) comparison data between the original operational data and the updated operational data and (ii) received entity feedback comprising at least one of match corrections, match additions, or match clarifications.

12. The computer program product of claim 11, wherein the program instructions executable by the processor further cause the processor to:

duplicate, by the transformation component, the first or the second data element for transformation to a pair of duplicate elements of the updated operational data.

13. The computer program product of claim 11, wherein the program instructions executable by the processor further cause the processor to:

store, by the training component, the comparison data regarding the clustering in a knowledge database accessible by the transformation component during transformation of operational data.

14. The computer program product of claim 11, wherein the program instructions executable by the processor further cause the processor to: train, by the training component, the transformation machine learning model based on the comparison data comparing the original operational data and the updated operational data, wherein the trained transformation machine learning model is employed by the transformation component during transformation.

* * * * *